United States Patent
Dudar

(10) Patent No.: US 10,167,823 B2
(45) Date of Patent: Jan. 1, 2019

(54) SYSTEMS AND METHODS FOR INDICATING CANISTER PURGE VALVE DEGRADATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 205 days.

(21) Appl. No.: 15/202,288

(22) Filed: Jul. 5, 2016

(65) Prior Publication Data
US 2018/0010532 A1    Jan. 11, 2018

(51) Int. Cl.
| F02M 35/00 | (2006.01) |
| F02M 35/02 | (2006.01) |
| F02M 25/08 | (2006.01) |
| F02D 41/04 | (2006.01) |
| F02D 41/00 | (2006.01) |

(52) U.S. Cl.
CPC ..... *F02M 35/0218* (2013.01); *F02D 41/0035* (2013.01); *F02D 41/042* (2013.01); *F02M 25/0809* (2013.01); *F02M 25/0836* (2013.01); *F02D 2200/0802* (2013.01)

(58) Field of Classification Search
CPC .......... F02M 35/0218; F02M 25/0809; F02M 25/0836; F02D 41/0035; F02D 41/042; F02D 2200/0802
See application file for complete search history.

(56) References Cited

U.S. PATENT DOCUMENTS

| 4,962,744 A | 10/1990 | Uranishi et al. |
| 6,230,693 B1* | 5/2001 | Meiller ............... F02M 25/0854 123/519 |
| 6,418,915 B1* | 7/2002 | Harrigan, Sr. ........ F02D 33/006 123/198 D |
| 7,066,152 B2 | 6/2006 | Stroia et al. |
| 7,233,845 B2 | 6/2007 | Veinotte |
| 7,350,512 B1 | 4/2008 | Meacham et al. |

(Continued)

OTHER PUBLICATIONS

Dudar, Aed M., "System and Methods for Managing Refueling Vapors," U.S. Appl. No. 14/313,629, filed Jun. 24, 2014, 35 pages.

(Continued)

*Primary Examiner* — Hieu T Vo
*Assistant Examiner* — Sherman Manley
(74) *Attorney, Agent, or Firm* — Julia Voutyras; McCoy Russell LLP

(57) ABSTRACT

Methods and systems are provided for indicating whether a canister purge valve in a vehicle evaporative emissions control system is degraded. In one example, an air intake system hydrocarbon (AIS HC) trap temperature may be monitored during a refueling event, and responsive to an indication that the AIS HC trap temperature change is greater than a predetermined threshold, it may be indicated that the canister purge valve is degraded. In this way, diagnosis of whether a vehicle canister purge valve is degraded may be indicated without the use of engine manifold vacuum, and may be advantageous for vehicles configured to operate for significant amounts of time without engine operation, or without intake manifold vacuum.

14 Claims, 9 Drawing Sheets

(56) References Cited

U.S. PATENT DOCUMENTS

| 9,410,507 B2* | 8/2016 | Pearce | F02M 25/0809 |
|---|---|---|---|
| 2015/0019066 A1 | 1/2015 | Dudar et al. | |
| 2015/0025781 A1 | 1/2015 | Pearce et al. | |
| 2015/0085894 A1 | 3/2015 | Yang et al. | |
| 2015/0120108 A1* | 4/2015 | Dudar | F02M 25/089 |
| | | | 701/22 |

OTHER PUBLICATIONS

Dudar, Aed M., et al., "Systems and Methods for Reducing Vehicle Evaporative Emissions," U.S. Appl. No. 15/068,839, filed Mar. 14, 2016, 71 pages.

Dudar, Aed M., et al., "Systems and Methods for targeted Heating in an Evaporative Fuel Vapor Canister Purge," U.S. Appl. No. 15/190,068, filed Jun. 22, 2016, 58 pages.

* cited by examiner

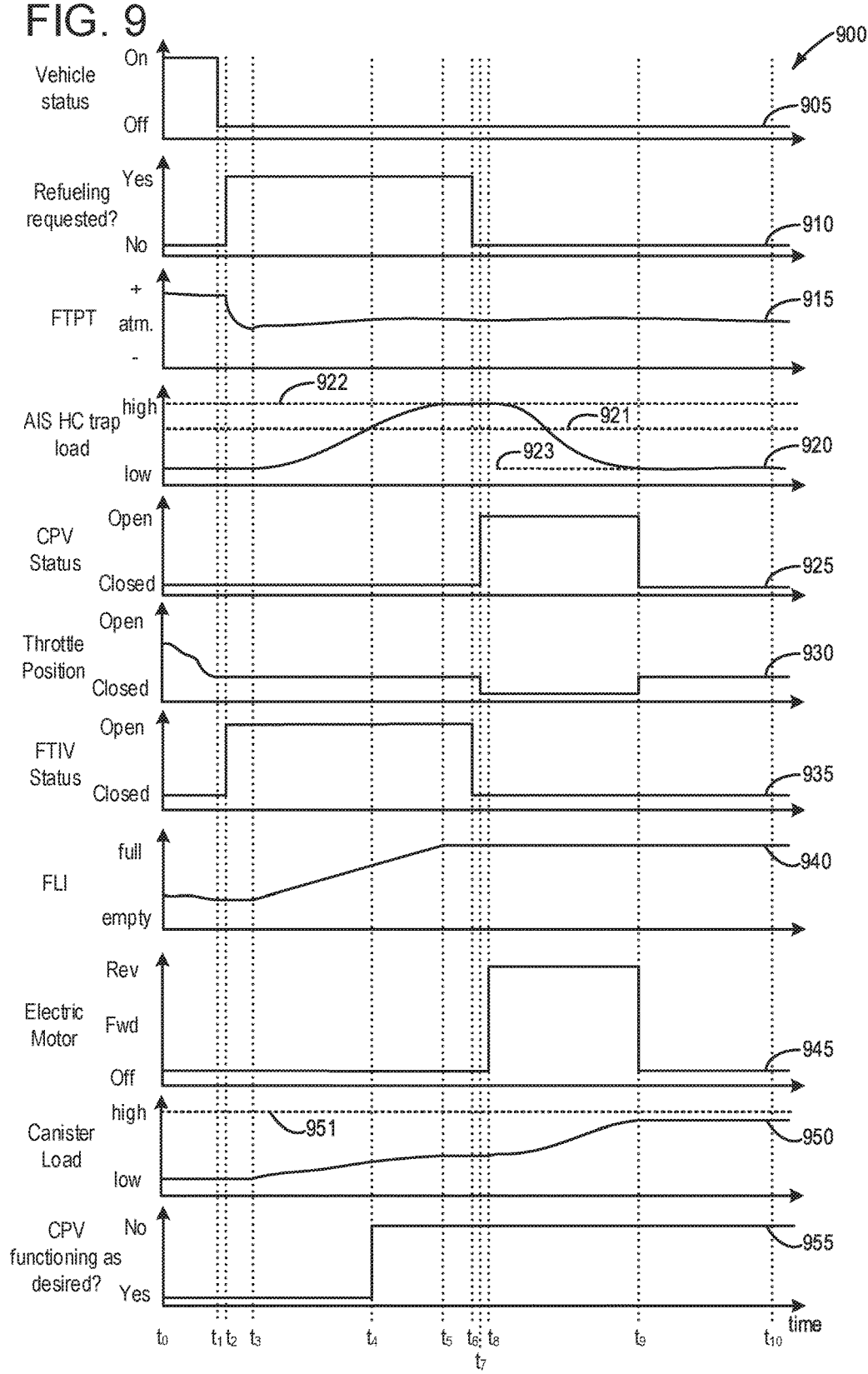

SYSTEMS AND METHODS FOR INDICATING CANISTER PURGE VALVE DEGRADATION

FIELD

The present description relates generally to methods and systems for detecting whether a canister purge valve is functioning as desired during a vehicle refueling event.

BACKGROUND/SUMMARY

Vehicle evaporative emission control systems may be configured to store fuel vapors from fuel tank refueling and diurnal engine operations in a fuel vapor canister, and then purge the stored vapors during a subsequent engine operation. The stored vapors may be routed to an engine intake system where the vapors may be inducted into the engine and combusted, thereby improving fuel economy.

In a typical canister purge operation, a canister purge valve (CPV) positioned along a conduit coupling the engine intake system and the fuel canister is opened while the engine is combusting air and fuel. This allows engine intake manifold vacuum to be applied to the fuel canister. Simultaneously, a canister vent valve (CVV) positioned along a conduit coupling the fuel canister and atmosphere is opened, allowing for fresh air to enter the canister. This configuration facilitates desorption of stored fuel vapors from the adsorbent material in the canister, where the desorbed fuel vapors are combusted in the engine, thereby regenerating the adsorbent material for further fuel vapor adsorption.

Diagnostics may be performed on the evaporative emissions control system, e.g., to detect undesired evaporative emissions in the system. A common pathway for undesired evaporative emissions in the emissions control system is through the CPV, the result of canister carbon dust accumulation and sealing surface deterioration. As such, diagnostics to detect the presence of undesired evaporative emissions stemming from a CPV may reduce undesired evaporative emissions, and may reduce disturbances to air-fuel ratio that may result from a CPV that is not functioning as desired.

US Patent Application US 20150019066 teaches that in some approaches, pressure readings from a pressure sensor in a fuel tank may be monitored during engine operation while the CPV is commanded closed in order to determine if air and/or fuel vapor may travel through the CPV while closed. For example, if the CPV is closed and the fuel tank is sealed off from atmosphere, a vacuum may build in the fuel tank during engine operation, which is indicative of a pathway for air and/or fuel vapor through the CPV. However, the inventors herein have recognized potential issues with such approaches. Specifically, such a diagnostic may be problematic in modern automobiles such as hybrid electric vehicles (HEVs) and start/stop (S/S), as in such vehicles the engine may be stopped (e.g., no engine rotation) regularly in order to conserve fuel. In another example, some gasoline turbo direct injection (GTDI) engines can spend extensive time in low manifold vacuum modes, wherein a diagnostic for a CPV that relies on engine manifold vacuum may not be possible. Still further, future engines may be vacuum-less, as manifold vacuum is a pumping loss that reduces internal combustion engine efficiency.

The inventors herein have recognized these issues and have developed a method comprising: monitoring a fuel vapor loading state of an adsorbent material positioned in an engine air intake while fuel is being added to a fuel tank that supplies fuel to the engine; and responsive to an indication that an increase in the fuel vapor loading state is greater than a first predetermined threshold: indicating a canister purge valve configured to seal the fuel tank from the engine air intake is degraded.

As one example, the fuel vapor loading state of the adsorbent material is indicated while fuel is being added to the fuel tank based on a monitored temperature change of the adsorbent material, wherein the temperature change is monitored by one or more temperature sensors embedded in the adsorbent material, and wherein a temperature increase indicates the adsorption of fuel vapors from the adsorbent material, and a temperature decrease indicates the desorption of fuel vapors from the adsorbent material.

By monitoring a temperature of an adsorbent material in an engine air intake system, it may be possible to provide the technical result of detecting CPV degradation without having to rotate an engine to produce vacuum. In particular, fuel vapors produced during fuel tank refilling may be captured in an engine air intake adsorbent material if a CPV is degraded. Filling a fuel tank may produce a positive pressure in a fuel tank relative to a pressure in the engine air intake adsorbent material, thereby creating a positive pressure motive force to move fuel vapors from the fuel tank to the engine air intake adsorbent material during conditions where the CPV is degraded. A temperature of the adsorbent material may change in response to adsorption of fuel vapors into the adsorbent material. The adsorbent material temperature change may be indicative of an increase in fuel vapors migrating from the fuel tank to the adsorbent material, and the migration of fuel vapor from the fuel tank to the adsorbent material may be indicative of CPV degradation.

The present disclosure may provide the following advantages. The approach may be beneficial to indicate CPV degradation without having to generate vacuum in the evaporative emissions control system. Additionally, the approach may be implemented without having to add system components so that system performance may be increased without increasing system cost. Further, the approach may reduce the possibility of emitting fuel vapors during conditions of CPV degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows an example timeline for conducting the CPV test diagnostic during a refueling event, and subsequently purging the AIS HC trap by reverse engine operation.

DETAILED DESCRIPTION

Figure 1:
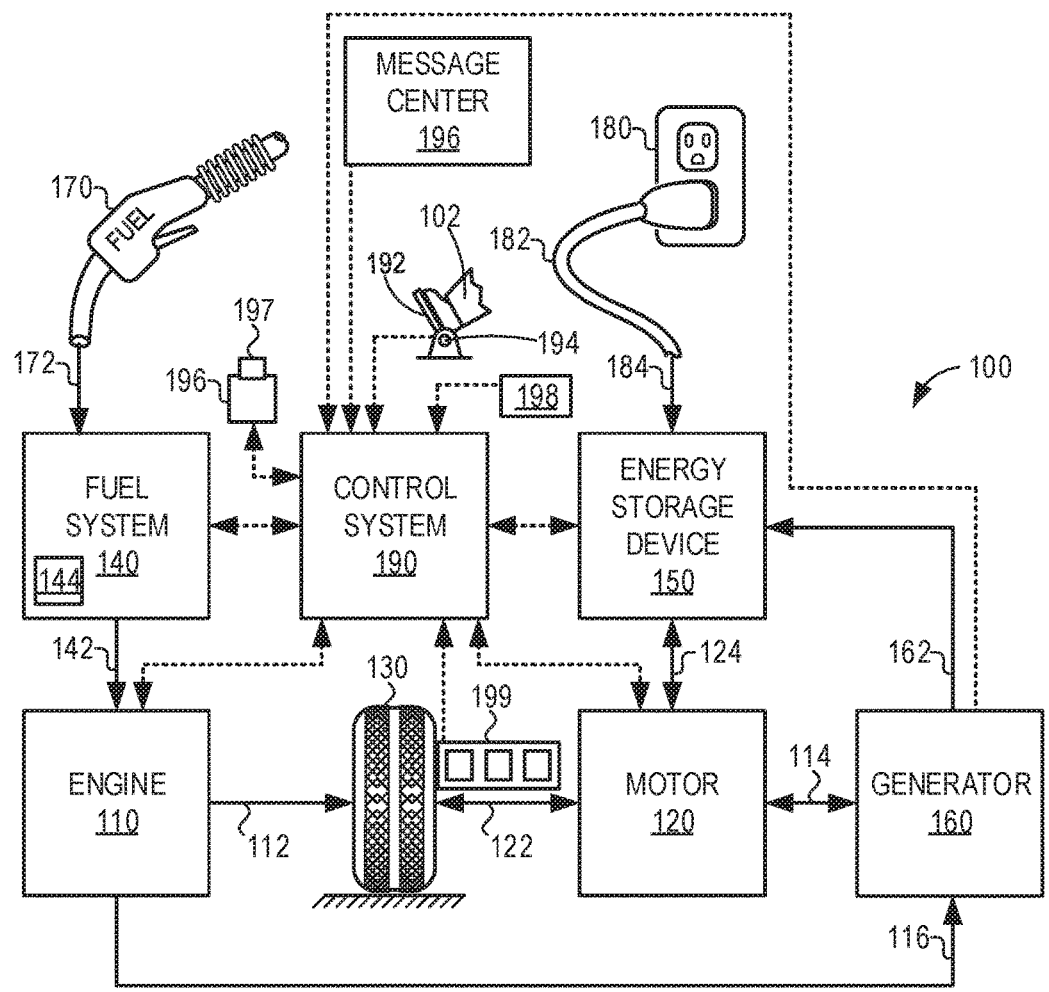
FIG. 1 schematically shows an example vehicle propulsion system.

The following description relates to systems and methods for detecting whether a canister purge valve is functioning as desired during a vehicle refueling event. The system and methods may be applied to a vehicle system that may operate for extended periods with reduced or no intake manifold vacuum, such as the hybrid vehicle system depicted in FIG. 1, and which may be capable of spinning the engine unfueled in reverse under certain operating conditions. The engine may be coupled to a fuel system and evaporative emissions system, and may include a fuel vapor canister in the evaporative emissions system and an air intake system hydrocarbon trap (AIS HC), in an intake manifold of the engine. During a refueling event, refueling vapors may be typically routed from the fuel tank to the fuel vapor canister due to a closed canister purge valve (CPV). However, if the CPV is degraded, refueling vapors may be routed from a fuel tank of the vehicle to the intake manifold through the closed CPV, where they may be adsorbed by the AIS HC trap. As such, a change in the loading state of the AIS HC trap during a refueling event may be indicative of a CPV that is not functioning as desired (e.g. degraded). The engine may comprise a plurality of combustion cylinders, such as the combustion cylinder depicted in FIG. 3. During a vehicle-off condition, if the engine is spun unfueled in reverse, a vacuum may be generated in the engine exhaust manifold, thus drawing fresh air through the exhaust manifold to the intake manifold, where the AIS HC trap is positioned. As such, if the CPV is opened while the engine is being spun in reverse, fuel vapors stored in the AIS HC trap may be desorbed and routed to the fuel vapor canister positioned in the evaporative emissions system. In this way, if the AIS HC trap becomes loaded with fuel vapors during a refueling event, the engine may be spun in reverse to purge the AIS HC trap vapors to the fuel vapor canister, which may thus reduce undesired evaporative emissions. Such reversing of the direction of the electric motor may be accomplished by employing an H-bridge circuit, such as the circuit shown in FIGS. 4A-4B. A method for detecting whether a CPV is degraded during a refueling event is illustrated in FIG. 5. A loading state of the AIS HC trap may be inferred by monitoring temperature changes within the AIS HC trap, as heat is generated responsive to the adsorption of fuel vapors in the AIS HC. If the AIS HC trap loading state reaches a first threshold during refueling, an indication that the CPV is degraded may be indicated. If the AIS HC trap loading state reaches a second threshold during refueling, then it may be desirable to purge the AIS HC trap to reduce the possibility of undesired evaporative emissions. If the vehicle is turned on shortly after the refueling event, the engine may be activated in order to purge the AIS HC trap, according to the method illustrated in FIG. 6. A timeline for conducting a CPV test diagnostic during a refueling event is illustrated in FIG. 7, where the AIS HC trap is indicated to reach the second threshold and as such, the engine is activated in order to purge the AIS HC trap. In another example, where the vehicle is not turned on for a duration following the refueling event, and where the AIS HC trap is loaded due to a refueling event, the engine may be spun unfueled in reverse in order to purge the fuel vapors adsorbed by the AIS HC trap to the fuel vapor canister, according to the method illustrated in FIG. 8. A timeline for conducting a CPV test diagnostic during a refueling event, where the AIS HC trap is indicated to become saturated with fuel vapors, and wherein the AIS HC trap is subsequently purged via spinning the engine in reverse, is illustrated in FIG. 9.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 6, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
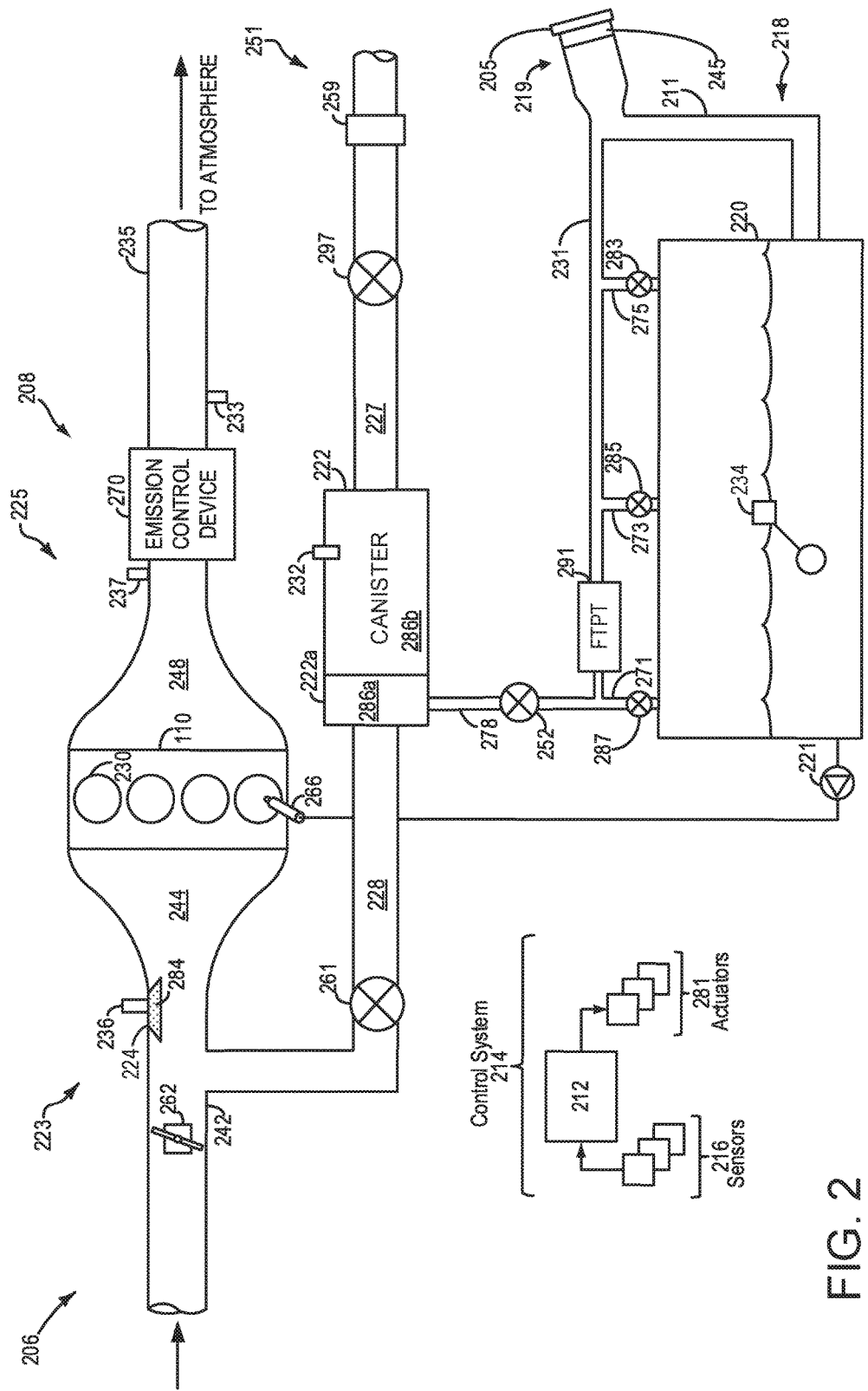
FIG. 2 schematically shows an example vehicle system with a fuel system and an evaporative emissions system.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the engine air intake 223. For example, hydrocarbon trap 224 may be positioned in the air box (not shown) or in the engine intake manifold 244 of engine 110 to adsorb fuel vapors emanating from unburned fuel in the intake manifold, puddled fuel from injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material 284 may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the engine air intake 223 even when engine 110 is shut down and stopped rotating. In some examples, one or more temperature sensor(s) 236 may be positioned (embedded) in the AIS HC trap in order to monitor adsorption and desorption of fuel vapors. Briefly, as fuel vapor is adsorbed by the AIS HC trap, heat may be generated. Conversely, as fuel vapor is desorbed from the trap, heat may be consumed. As such, adsorption and desorption of fuel vapor by the AIS HC trap may be monitored and estimated based on temperature changes within the AIS HC trap. In some examples, as will be discussed in further detail below, temperature changes indicated in the AIS HC trap during a refueling event may be indicative of a canister purge valve (CPV) 261 that is degraded.

Fuel system 218 may include a fuel tank 220 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 while closing canister purge valve (CPV) 261 to direct refueling vapors into canister 222 while preventing fuel vapors from being directed into the intake manifold. However, in some examples, if the CPV is degraded, then refueling vapors may be directed from the fuel tank to the intake manifold 244, as the path from the fuel tank to the intake manifold may represent a pathway of least resistance for fuel vapors in the event of a CPV that is degraded. As such, fuel vapors that reach the intake manifold 244 may be adsorbed by the AIS HC trap 224 positioned in the engine air intake 223. By monitoring temperature changes within the AIS HC trap during refueling events, whether a CPV is degraded may be indicated, as will be discussed in greater detail below.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252. Herein, the vacuum generated by the intake manifold of the operating engine may be used to draw fresh air through vent 27 and through fuel vapor canister 222 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 5, FIG. 6, and FIG. 8.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3:
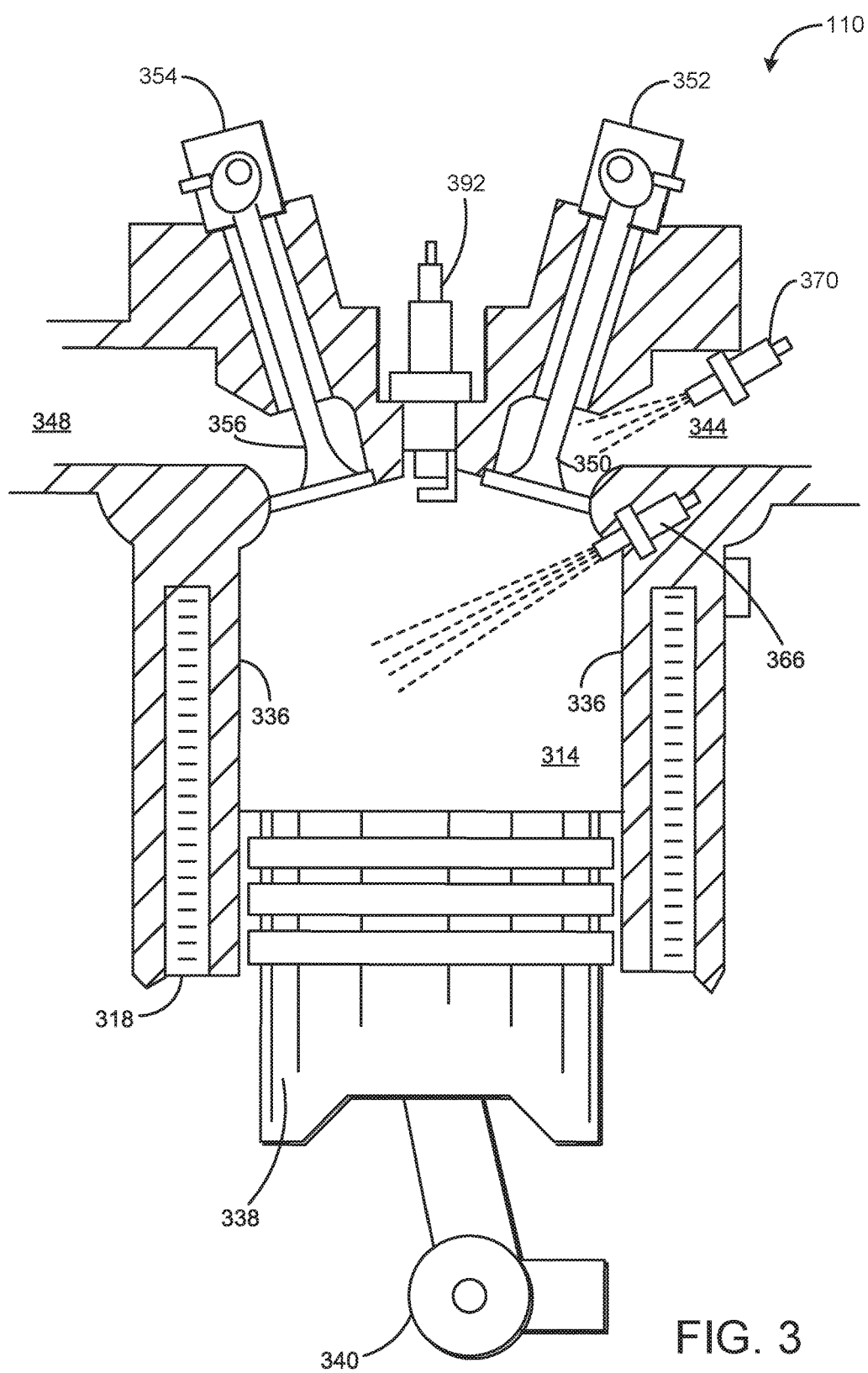
FIG. 3 schematically shows an example combustion cylinder for an engine.

FIG. 3 depicts an example of a combustion chamber or cylinder that may be included in engine 110. Cylinder 314 may include cylinder walls 336 with piston 338 positioned therein. Piston 338 may be coupled to crankshaft 340 so that reciprocating motion of the piston is translated into rotational motion of the crankshaft. Crankshaft 340 may be coupled to at least one drive wheel of the passenger vehicle via a transmission system. Further, a starter motor may be coupled to crankshaft 340 via a flywheel to enable a starting operation of engine 110, and/or to rotate the engine in an unfueled mode.

Cylinder 314 can receive intake air via intake air passage 344, which may be one of a plurality of intake air passages coupled to cylinder 314. Intake air passage 344 may communicate with other cylinders of engine 110 in addition to cylinder 314. In some examples, one or more of the intake passages may include a boosting device such as a turbocharger or a supercharger. Exhaust passage 348 can receive exhaust gases from cylinder 314 as well as from other cylinders of engine 110.

Each cylinder of engine 110 may include one or more intake valves and one or more exhaust valves. For example, cylinder 314 is shown including at least one intake poppet valve 350 and at least one exhaust poppet valve 356 located at an upper region of cylinder 314. In some examples, each cylinder of engine 110, including cylinder 314, may include at least two intake poppet valves and at least two exhaust poppet valves located at an upper region of the cylinder.

Intake valve 350 may be controlled by a controller via actuator 352. Similarly, exhaust valve 356 may be controlled by a controller via actuator 354. During some conditions, the controller may vary the signals provided to actuators 352 and 354 to control the opening and closing of the respective intake and exhaust valves. The position of intake valve 350 and exhaust valve 356 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 314 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 314 can have a compression ratio, which is the ratio of volumes when piston 338 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some examples, each cylinder of engine 110 may include a spark plug 392 for initiating combustion. An ignition system (not shown) can provide an ignition spark to cylinder 314 via spark plug 392 in response to a spark advance signal from a controller, under select operating modes. However, in some examples, spark plug 392 may be omitted, such as where engine 110 may initiate combustion by auto-ignition or by injection of fuel as may be the case with some diesel engines.

In some examples, each cylinder of engine 110 may be configured with one or more fuel injectors for providing fuel thereto. As a non-limiting example, cylinder 314 is shown including two fuel injectors 366 and 370. Fuel injector 366 is shown coupled directly to cylinder 314 for injecting fuel directly therein in proportion to a pulse width of a signal received from a controller via an electronic driver. In this manner, fuel injector 366 provides what is known as direct injection (hereafter referred to as "DI") of fuel into cylinder 314. While FIG. 3 shows injector 366 as a side injector, it may also be located overhead of the piston, such as near the position of spark plug 392. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 366 from a high pressure fuel system including a fuel tank, fuel pumps, a fuel rail, etc., as depicted in FIG. 2. Alternatively, fuel may be delivered by a single stage fuel pump at lower pressure, in which case the timing of the direct fuel injection may be more limited during the compression stroke than if a high pressure fuel system is used.

Fuel injector 370 is shown arranged in intake air passage 344, rather than in cylinder 314, in a configuration that provides what is known as port injection of fuel (hereafter referred to as "PFI") into the intake port upstream of cylinder 314. Fuel injector 370 may inject fuel in proportion to a pulse width of a signal received from a controller via an electronic driver.

Fuel may be delivered by both injectors to the cylinder during a single cycle of the cylinder. For example, each injector may deliver a portion of a total fuel injection that is combusted in cylinder 314. Further, the distribution and/or relative amount of fuel delivered from each injector may vary with operating conditions such as described herein below. The relative distribution of the total injected fuel among injectors 366 and 370 may be referred to as a first injection ratio. For example, injecting a larger amount of the fuel for a combustion event via (port) injector 370 may be an example of a higher first ratio of port to direct injection, while injecting a larger amount of the fuel for a combustion event via (direct) injector 366 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 3 shows only one cylinder of a multi-cylinder engine. Accordingly, each cylinder may similarly include its own set of intake/exhaust valves, fuel injector(s), spark plug, etc.

Fuel injectors 366 and 370 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 370 and 366, different effects may be achieved. Fuel injectors 366 and 370 may be configured to inject fuel from the same fuel tank, from different fuel tanks, from a plurality of the same fuel tanks, or from an overlapping set of fuel tanks.

For PHEVs, the fuel vapor canister primarily adsorbs refueling vapors, as running loss and diurnal vapors are sealed within the fuel tank by the FTIV. The AIS HC trap may typically capture hydrocarbons emitted by injectors from fuel that may puddle in intake. The MS HC trap may also capture uncombusted fuel that is trapped within the engine cylinders themselves. However, the inventors herein have additionally recognized that the AIS HC trap may be utilized to conduct a diagnostic test on a CPV (e.g. 261). By monitoring AIS HC trap temperature during refueling events, if the CPV is degraded, then a change in temperature of the AIS HC trap may be indicated. However, in some examples, the AIS HC trap may become loaded, or saturated with fuel vapors during a refueling event due to the CPV being degraded. Therefore, it may be desirable to purge the AIS HC trap of fuel vapors subsequent to a refueling event. In some examples, if the vehicle is driven shortly after the refueling event where the AIS HC trap was indicated to be loaded, the engine may activated, where fuel injection and spark may be provided to the cylinders, such that intake manifold vacuum may purge the MS HC trap of fuel vapors. However, the inventors herein have recognized that in some examples where the vehicle may not be driven shortly, or immediately, after refueling, the AIS HC trap may be cleaned by spinning the engine unfueled (and without spark) in reverse. Such a method may improve fuel economy, as the AIS HC trap may be purged without unnecessarily fueling the engine. For example, HEVs and other vehicles which couple the engine drive train to an electric motor that can be powered by a battery, the engine may be spun unfueled and at a low speed using the electric motor. This action also generates heat, which may cause liquid fuel within the cylinders to vaporize. When the engine is spun in the default direction, a vacuum is generated in the intake manifold, while a pressure is generated in the exhaust system. However, if the engine is spun in reverse, a vacuum is generated in the exhaust system and a pressure is generated in the intake manifold via reciprocating pistons. Fresh air is thereby sucked into the exhaust manifold. Air flow through the engine displaces hydrocarbons from the exhaust and engine cylinders and desorbs stored fuel vapors within the AIS HC trap. The desorbed fuel vapors flow from a higher pressure in the intake manifold to a lower pressure in the fuel vapor storage canister where they may be stored for subsequent purging. As will be discussed in further detail below, by commanding open the CPV (e.g., 261) and commanding open or maintaining open the CVV (e.g., 297), while simultaneously closing the throttle (e.g., 262), fuel vapors stored in the AIS HC trap may be purged to the fuel vapor storage canister (e.g., 222) for storage. Such a method may prevent undesired evaporative emissions.

Figure 4A:
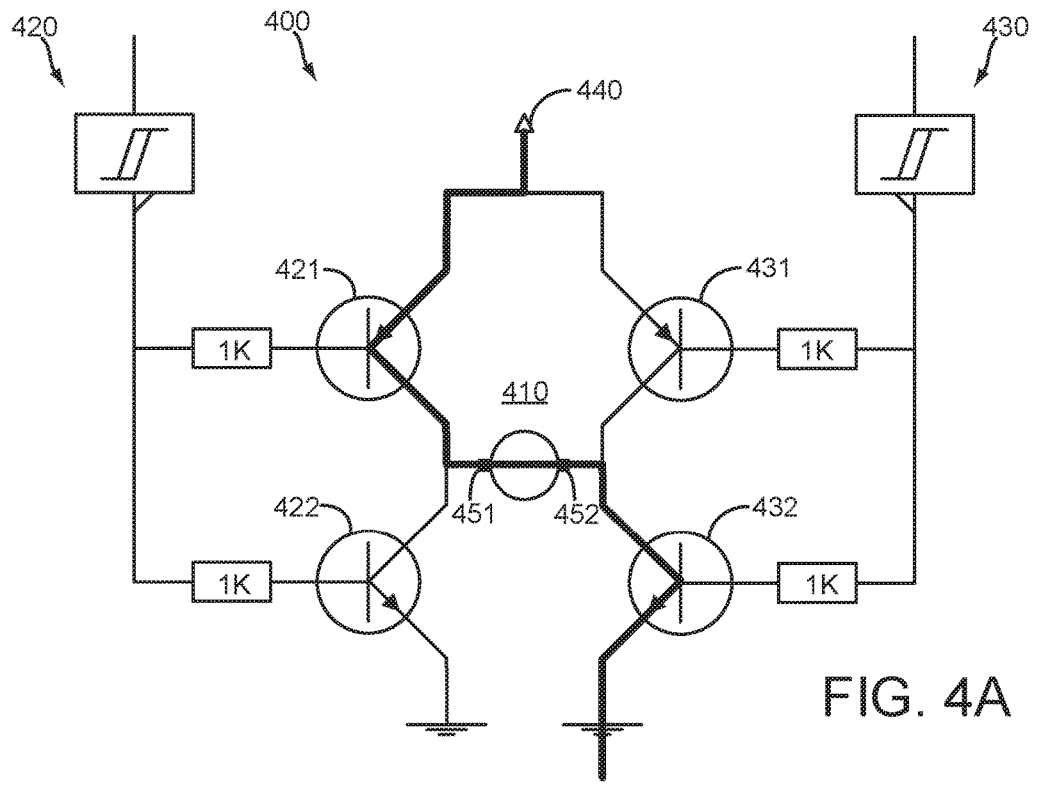
FIGS. 4A-4B show a schematic depiction of an electronic circuit configured to reverse the spin orientation of an electric motor.
Figure 4B:
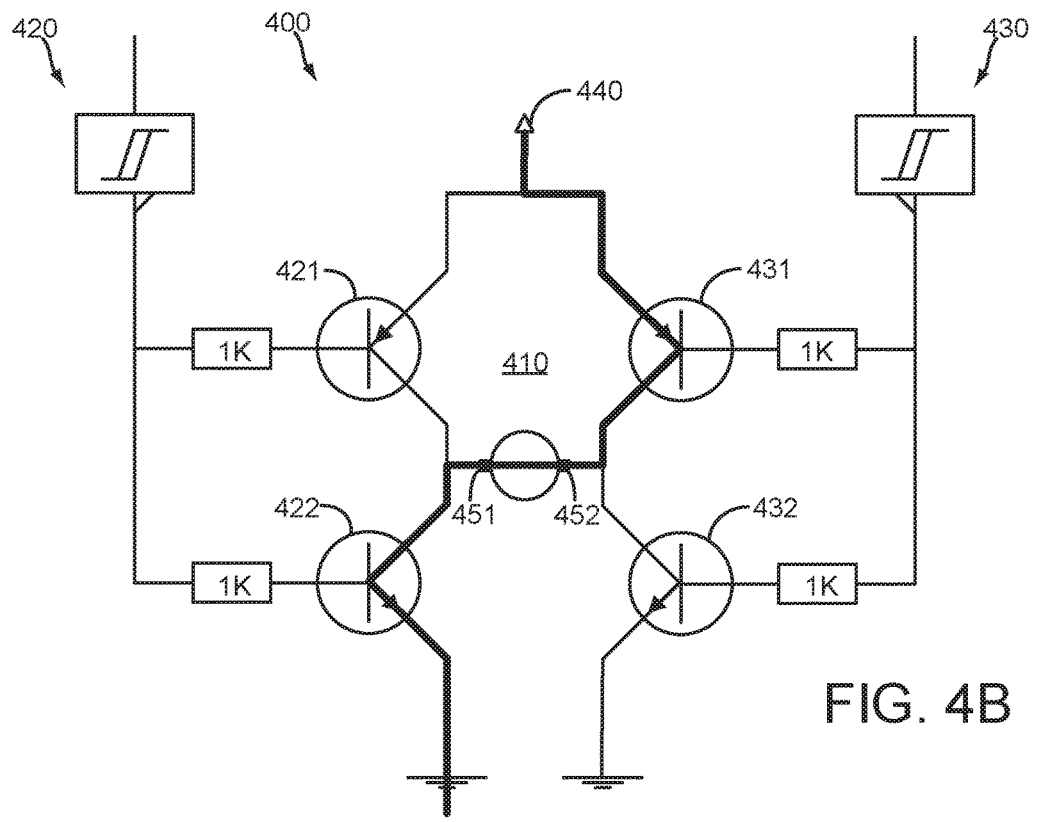
Figure 5:
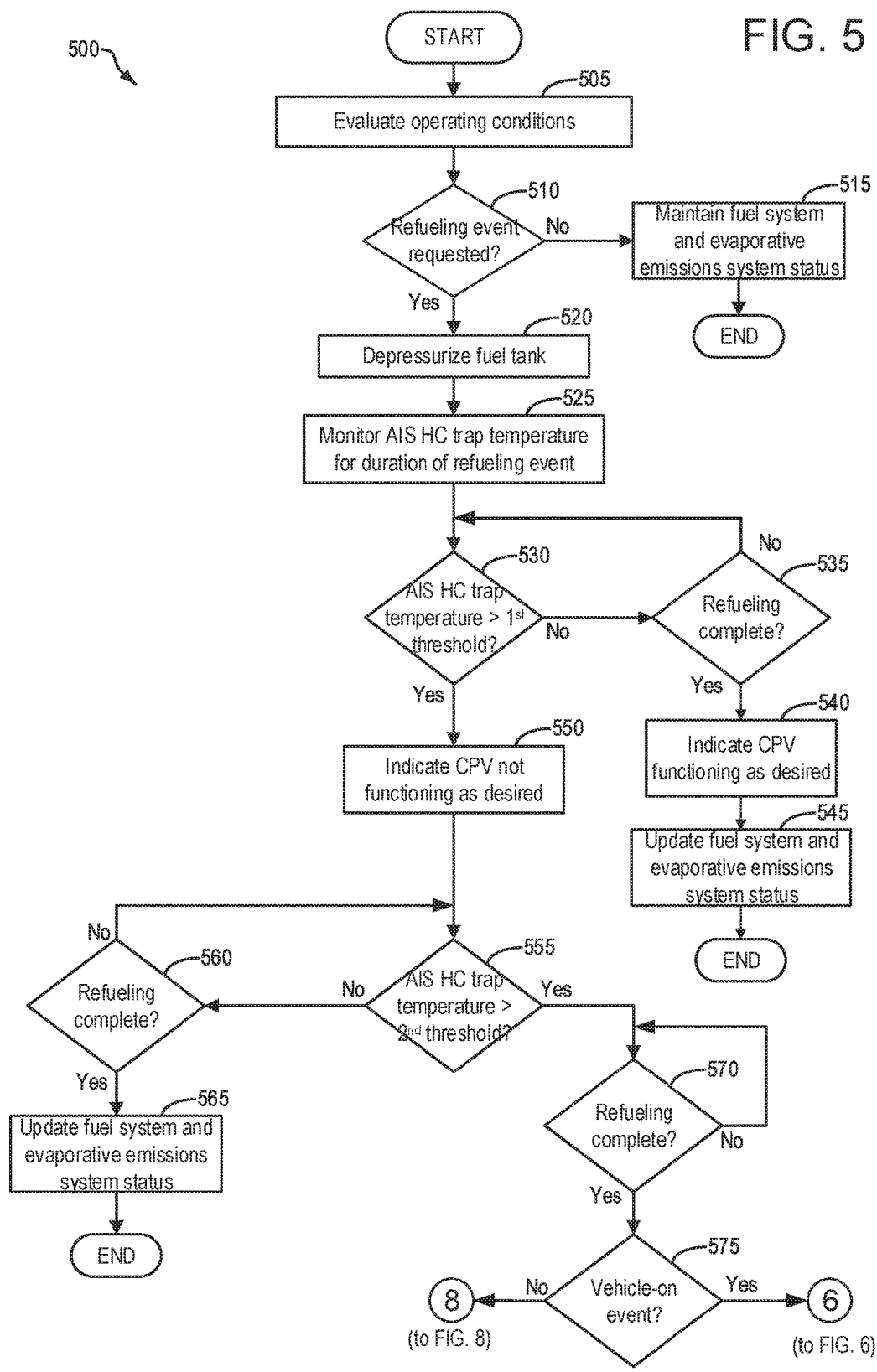
FIG. 5 shows a high level flowchart for an example method for a CPV test diagnostic based on a loading state of an air intake system hydrocarbon (AIS HC) trap.

FIGS. 4A and 4B show an example circuit 400 that may be used for reversing a spin orientation of an electric motor. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are off. In this confirmation, the left lead 451 of motor 410 is connected to power source 440, and the right lead 452 of motor 410 is connected to ground. In this way, motor 400 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. During one or more of or each of the forward engine rotation operations, fuel vapors may also be purged to the engine with and/or without engine combustion occurring.

In FIG. 4B, transistors 422 and 431 are activated, while transistors 421 and 432 are off. In this confirmation, the right lead 452 of motor 410 is connected to power source 440, and the left lead 451 of motor 410 is connected to ground. In this way, motor 400 may run in a reverse direction.

Turning now to FIG. 5, an example method 500 for conducting a canister purge valve (CPV) test diagnostic during a vehicle refueling event, is shown. More specifically, method 500 may be used to monitor a temperature of an air intake system hydrocarbon (AIS HC) trap adsorbent material in an engine air intake during a refueling event, and responsive to an indication that the AIS HC trap is being loaded with fuel vapors, indicate that the CPV is degraded. For example, the CPV may be commanded closed prior to fuel being added to the fuel tank in order to seal the fuel tank from engine air intake, and maintained closed during the fuel being added to the fuel tank. If the CPV is degraded, fuel vapors from the fuel tank generated while adding fuel to the fuel tank may be routed from the fuel tank to the engine air intake through the CPV that is degraded. If the CPV is not degraded (e.g. functioning as desired), fuel vapors from the fuel tank generated while adding fuel to the fuel tank may be routed from the fuel tank to a fuel vapor canister positioned in an evaporative emissions system of the vehicle, and not to the adsorbent material positioned in the engine air intake. In one example, an indication that the CPV is degraded may comprise an increase in a fuel vapor loading state of AIS HC adsorbent material greater than a first predetermined threshold, where the first predetermined threshold may be adjusted responsive to an indication of ambient temperature. Method 500 will be described with reference to the systems described herein and shown in FIGS. 1-4B, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1 and FIG. 2. The controller may transform operating states of the engine, fuel system, and evaporative emissions system via actuators, such as CPV (e.g., 261), fuel tank isolation valve (FTIV) (e.g., 252), canister vent valve (CVV) (e.g., 297), fuel injector(s) (e.g., 266), refueling lock (e.g., 245), etc., according to the methods below.

Method 500 begins at 505 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Proceeding to 510, method 500 may include indicating whether a refueling event is requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. Such examples are in no way meant to be limiting, and a refueling request may be indicated via any manner known in the art. If, at 505, a request for refueling is not indicated, method 500 may proceed to 515, and may include maintaining the vehicle fuel system and evaporative emissions status. For example, components such as the FTIV, CVV, CPV, and refueling lock may be signaled by the controller to maintain their current conformation and/or activity. Method 500 may then end.

Returning to 510, if a request for refueling is indicated, method 500 may proceed to 520. At 520, method 500 may include depressurizing the fuel tank. For example, the controller (e.g., 212) may open FTIV (e.g., 252) and open or maintain open a vent path between the fuel vapor canister and atmosphere (e.g., open CVV), while maintaining the CPV (e.g., 261) closed, to depressurize the fuel tank before allowing enabling fuel to be added therein. The FTIV may be opened in a manner to depressurize the fuel tank at a predetermined rate, so as to prevent rapid depressurization. For example, FLVV and GVV may cork shut responsive to rapid depressurization. By commanding open the FTIV, the fuel tank may be selectively coupled to adsorbent material contained in a fuel vapor canister positioned in an evaporative emissions system of the vehicle. A refueling lock (e.g., 245), may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the fuel vapor canister, and to allow gasses stripped of refueling vapors to be flowed to atmosphere.

Proceeding to 525, method 500 may include monitoring AIS HC trap temperature for the duration of the refueling event. For example, temperature of the AIS HC trap may be indicated by a temperature sensor positioned within the AIS HC trap (e.g., 236). As discussed above, as fuel vapor is adsorbed by an adsorbent in the AIS HC trap, heat may be generated. As such, an indication of AIS HC trap loading state may be determined during the refueling event. Accordingly, proceeding to 530, method 500 may include indicating whether the AIS HC trap temperature, or AIS HC trap temperature change, is greater than a first threshold. For example, the first threshold may comprise a predetermined AIS HC temperature threshold, or threshold temperature change, indicative of an AIS HC trap becoming loaded with fuel vapors during the refueling event to an extent that would not be expected if the CPV were not degraded. The threshold temperature may be adjusted based on ambient temperature. In one example, a table or function of empirically determined threshold temperatures may be indexed based on ambient temperature. The table or function outputs a new first threshold value. Additionally, or alternatively, similar compensation may be provided based on ambient pressure and fuel type.

If, at 530, AIS HC trap temperature, or AIS HC trap temperature change, is not greater than the first threshold, method 500 may proceed to 535. At 535, method 500 may include indicating whether the refueling event is complete. For example, completion of refueling at 535 may be indicated when the fuel level has plateaued for a predetermined duration of time, where fuel level is indicated via a fuel level sensor (e.g., 234) located in the fuel tank (e.g., 220), and which may provide an indication of the fuel level ("fuel level input") to the controller (e.g., 212). In another example, completion of refueling at 535 may be additionally or alternatively indicated via an indication that a refueling nozzle has been removed from the fuel filler neck, that a fuel cap has been replaced, that a refueling door has been closed, that a refueling lock has been re-locked, etc. While not explicitly illustrated, it may be understood that responsive to an indication of completion of the refueling event, the FTIV (e.g., 252) may be commanded closed to seal the fuel tank. If, at 535, it is indicated that the refueling event is not complete, method 500 may return to 530 where AIS HC trap temperature (and fuel level) may be continued to be monitored.

Alternatively, if at 535, it is indicated that the refueling event is complete, method 500 may proceed to 540. At 540, method 500 may include indicating that the CPV is functioning as desired. For example, because a refueling event was conducted and AIS HC trap temperature, or AIS HC trap temperature change, remained below the first threshold, then it may be determined that fuel tank vapors were not routed from the fuel tank to the AIS HC trap. As such, it may be determined that the CPV prevented such routing of fuel vapors from the fuel tank to the AIS HC trap, and as such, the CPV may be indicated to be functioning as desired. Proceeding to 545, method 500 may include updating the status of the fuel system and evaporative emissions system. For example, fuel level in the fuel tank may be updated to reflect the recent refueling event. Furthermore, while not explicitly illustrated, it may be understood that during the refueling event a fuel vapor canister (e.g., 222) loading state may additionally be monitored via one or more temperature sensor(s) (e.g., 232). In other words, while fuel is being added to the fuel tank, fuel vapors from the fuel tank may be adsorbed by the fuel vapor storage canister (e.g., 222) positioned in the evaporative emissions control system (e.g., 251) of the vehicle, wherein fuel vapors from the fuel tank may be routed from the fuel tank to the fuel vapor storage canister and not to the adsorbent material (e.g., AIS HC trap) positioned in the engine air intake responsive to the CPV functioning as desired. As such, at 545 a fuel vapor storage canister (e.g., 222) loading state may additionally be updated to reflect the refueling event. Furthermore, a canister purge schedule may be updated, as a result of the canister loading state, such that the loaded fuel vapor canister may be purged at the next available opportunity. Method 500 may then end.

Returning to 530, if it is indicated that AIS HC trap temperature, or AIS HC trap temperature change, is greater than the first threshold, method 500 may proceed to 550. At 550, method 500 may include indicating the CPV is degraded. For example, because the AIS HC trap registered a temperature rise greater than the first threshold, it may be determined that fuel vapors generated during the refueling event were routed from the fuel tank to the AIS HC trap during the refueling event. As the fuel vapors were not prevented from being routed from the fuel tank to the AIS HC trap during the refueling event, the CPV may be indicated to be degraded, and the indication may be stored at the controller (e.g., 212).

Proceeding to 555, method 500 may include indicating whether the AIS HC trap temperature, or temperature change, has reached a second threshold. For example, the second threshold may comprise a predetermined AIS HC temperature threshold, or temperature change threshold, indicative of the AIS HC trap becoming saturated (or nearly saturated) with fuel vapors. If, at 555 it is indicated that the AIS HC trap temperature, or temperature change, has not reached the second threshold, method 500 may proceed to 560. At 560, method 500 may include indicating whether the refueling event is complete.

For example, as discussed above, completion of refueling may be indicated when the fuel level has plateaued for a predetermined time duration, and/or via an indication that a refueling nozzle has been removed from the fuel filler neck, that a fuel cap has been replaced, that a refueling door has been closed, that a refueling lock has been re-locked, etc. Further, as discussed above, while not explicitly illustrated, it may be understood that responsive to an indication of completion of the refueling event, the FTIV (e.g., 252) may be commanded closed to seal the fuel tank.

If, at 560, it is indicated that the refueling event is not complete, method 500 may return to 555, and may include continuing to monitor AIS HC trap temperature, as discussed above. Alternatively, if at 560 it is indicated that the refueling event is complete, method 500 may proceed to 565. At 565, method 500 may include updating the status of the fuel system and evaporative emissions system. For example, fuel level in the fuel tank may be updated to reflect the recent refueling event. Furthermore, as discussed above, it may be understood that during the refueling event the fuel vapor canister (e.g., 222) loading state may additionally be monitored via one or more temperature sensor(s) (e.g., 232). Consequently, at 565, a canister loading state may additionally be updated to reflect the refueling event. Furthermore, a canister purge schedule may be updated, as a result of the canister loading state, such that the loaded fuel vapor canister may be purged at the next available opportunity.

In some examples, an evaporative emissions test schedule may be updated, as a result of the indication of the CPV being degraded. For example, future evaporative emissions tests may be postponed until it is indicated that the CPV that is degraded has been evaluated. Accordingly, in some examples, a malfunction indicator light (MIL) may be illuminated on the vehicle dash to alert the vehicle operator of the need to service the vehicle. In a still further example, due to the indication of the CPV being degraded, the vehicle may be scheduled to run in an electric mode whenever possible, to limit fuel tank vacuum which may develop during engine-on conditions as a result of the CPV that is degraded. However, since the AIS HC temperature is not greater than the second threshold, AIS loading is low enough to not automatically start the engine when a vehicle-on event occurs. In other words, responsive to an indication that an increase in fuel vapor loading state of the AIS HC trap is greater than the first predetermined threshold, but less than the second predetermined threshold, it may be indicated that the CPV is degraded, and not actively purging the AIS HC trap adsorbent material. Method 500 may then end.

Returning to 555, if it is indicated that AIS HC trap temperature has reached the second threshold, method 500 may proceed to 570. At 570, it may be determined whether the refueling event is complete, as described above with regard to step 535 and step 560 of method 500. If, at 570, it is indicated that the refueling event is not complete, method 500 may continue to monitor fuel level and AIS HC trap temperature, and to monitor for whether the refueling event is complete. If, at 570, it is indicated that the refueling event is complete, method 500 may proceed to 575. As discussed above, while not explicitly illustrated, it may be understood that responsive to an indication of completion of the refueling event, the FTIV (e.g., 252) may be commanded closed to seal the fuel tank.

At 575, method 500 may include indicating whether a vehicle-on event is indicated. For example, it may be understood that a vehicle-on event may include the vehicle operator turning an ignition key, pressing an ignition button on the dash, etc. As such, a vehicle-on event may comprise an event where the vehicle operator activates the vehicle in order to drive away from the refueling station, for example. In some examples, such as hybrid electric vehicles (HEVs) and plug-in hybrid electric vehicles (PHEVs), the engine may not additionally start responsive to a vehicle-on event. In such examples, method 500 may proceed to FIG. 6, such that the engine may be activated in order to clean the AIS HC trap of fuel vapors resulting from the refueling event. For example, activating the engine may comprise spinning the vehicle engine fueled in a forward direction and commanding open an air intake throttle that controls airflow to an intake manifold of the engine, where spinning the engine fueled in the forward direction creates vacuum in the intake manifold. In such an example, the CPV may be commanded or maintained closed, wherein vacuum created in the intake manifold by spinning the engine fueled in the forward direction draws atmospheric air past the air intake throttle and across the adsorbent material positioned in the engine air intake, desorbing fuel vapors from the adsorbent material and routing the desorbed fuel vapors to the engine where the fuel vapors are combusted. During the desorbing of fuel vapors, a temperature change of the adsorbent material positioned in the engine air intake may be monitored via one or more temperature sensor(s) positioned in the adsorbent material, where it may be indicated that the adsorbent material is clean responsive to temperature change below a predetermined threshold. Responsive to an indication that the adsorbent material in the engine air intake is clean, default driving conditions may be resumed based on vehicle operator demand.

Alternatively, in some examples, subsequent to a refueling event where the AIS HC trap is loaded with fuel vapors, the vehicle may not be turned on for a period of time. Examples may include a situation where a vehicle operator goes inside the refueling station in order to pay for fuel, or to purchase other items subsequent to refueling. Other examples may include a remote refueling event, where the vehicle may be refueled remotely, and may thus not be immediately driven subsequent to refueling. As such, if a vehicle-on event is not indicated, method 500 may proceed to FIG. 8, where the engine may be spun in reverse in order to purge fuel vapors stored in the AIS HC trap to the fuel vapor canister (e.g., 222). For example, spinning the engine in reverse may further include commanding closed the air intake throttle, commanding closed a fuel tank isolation valve to seal the fuel tank from the engine air intake and from the fuel vapor canister, and commanding open the CPV, where spinning the engine unfueled in the reverse direction creates vacuum in an exhaust manifold of the engine. Vacuum created in the exhaust manifold may thus draw atmospheric air across the adsorbent material (e.g., AIS HC trap) positioned in the engine air intake, desorbing fuel vapors from the adsorbent material and routing the desorbed fuel vapors to the fuel vapor canister (e.g., 222) positioned in an evaporative emissions control system where the fuel vapors are adsorbed. During desorbing fuel vapors from the adsorbent material, temperature change of the adsorbent material may be monitored via one or more temperature sensor(s) positioned in the adsorbent material in the engine air intake, where temperature change below a threshold indicates fuel vapor load of the adsorbent material below a first threshold. Furthermore, during the desorbing, temperature change of adsorbent material positioned in the fuel vapor canister (e.g., 222) may additionally be monitored, where temperature change above another threshold indicates fuel vapor load of the adsorbent material above a second threshold. As such, spinning the engine unfueled in reverse may be stopped responsive to fuel vapor load of the adsorbent material positioned in the intake manifold below the first threshold, or responsive to fuel vapor load of the adsorbent material contained in the fuel vapor canister above the second threshold. In one example, if a vehicle-on event is not indicated within a predetermined time duration of the completion of the refueling event, then method 500 may proceed to FIG. 8, whereas if a vehicle-on event occurs prior to the predetermined time duration, method 500 may proceed to FIG. 6. For example, if 1 minute, or two minutes passes without the vehicle being turned on, method 500 may proceed to FIG. 8. However, the example predetermined timeframes mentioned above are not meant to be limiting, and the predetermined timeframe may be longer or shorter than the examples depicted herein.

In summary, responsive to an indication that an increase in the fuel vapor loading state of an AIS HC trap adsorbent material is greater than the first predetermined threshold and greater than the second predetermined threshold, it may be indicated that the CPV is degraded, and the AIS HC adsorbent material may be actively purged.

Figure 6:
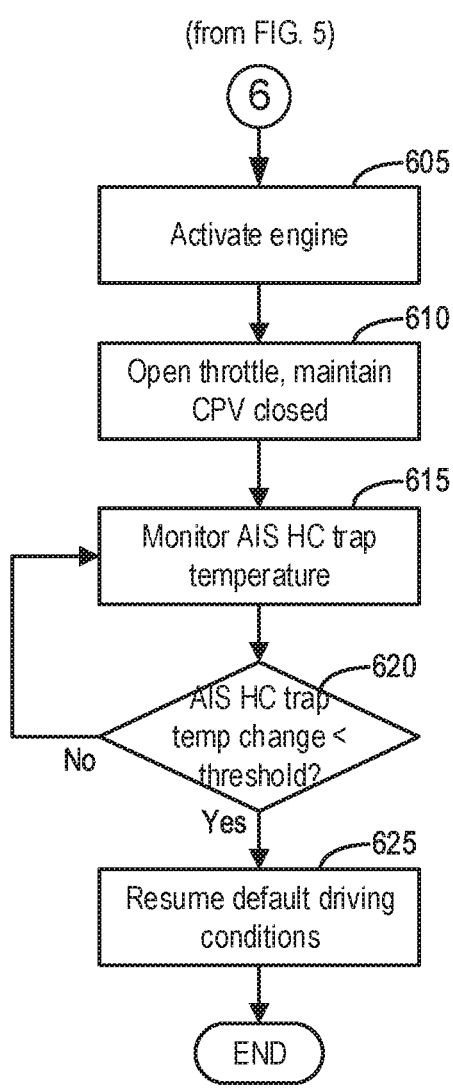
FIG. 6 shows a high level flowchart for an example method for cleaning an AIS HC trap during engine operation.
Figure 7:
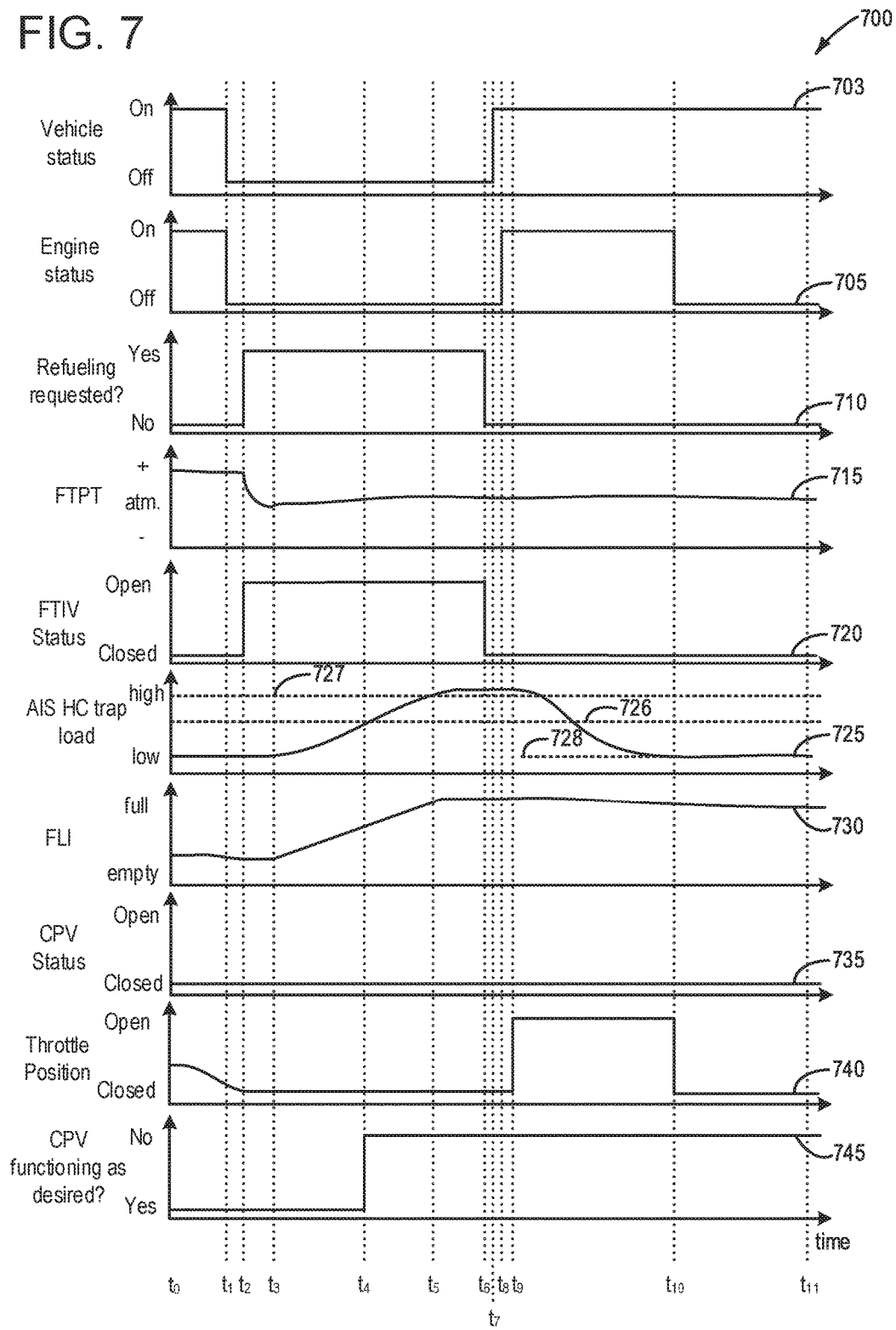
FIG. 7 shows an example timeline for conducting the CPV test diagnostic during a refueling event, and subsequently purging the AIS HC trap during engine operation.

Turning now to FIG. 6, a method 600 for activating a vehicle engine responsive to a vehicle-on event in order to purge an AIS HC trap of fuel vapors, is shown. More specifically, method 600 may continue from method 500 where it was indicated that an AIS HC trap was loaded with fuel vapors during a refueling event, and where a vehicle-on event was indicated, in some examples within a predetermined timeframe, subsequent to the refueling event. The vehicle may comprise a HEV, or a PHEV, for example, and as such, the engine may not be activated depending on driving conditions. Therefore, the engine may be activated according to method 600 in order to purge AIS HC trap of fuel vapors. In this way, undesired evaporative emissions may be reduced. Method 600 will be described with reference to the systems described herein and shown in FIGS. 1-3, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1 and FIG. 2. The controller may transform operating states of the engine, fuel system, and evaporative emissions system using actuators, such as throttle (e.g., 262), canister purge valve (CPV) (e.g., 261), fuel injectors (e.g., 266), spark plugs (e.g., 392), etc., according to the method below.

Method 600 begins at 605 and may include activating the engine. For example, activating the engine may include providing fuel and spark to the engine cylinders based on an indication that the vehicle is operating in an electric mode. Providing fuel to the engine cylinders may include actuating the fuel injector(s) (e.g., 266) to inject fuel into the cylinder(s), and providing spark may include actuating a spark plug (e.g., 392) in order to initiate combustion within the engine. With the engine activated, vacuum may build in the engine intake manifold (e.g., 244), and may thus be used to clean the AIS HC trap. Accordingly, proceeding to 610, method 600 may include commanding open the throttle (e.g., 262), and may further include maintaining the CPV closed. By commanding open the throttle with the CPV maintained closed, air may be drawn through an intake passage (e.g., 242) across the AIS HC trap (e.g., 224), thus purging fuel vapors from the AIS HC trap to engine intake for combustion.

Proceeding to 615, method 600 may include monitoring AIS HC trap temperature. For example, as discussed above, one or more temperature sensor(s) (e.g., 236) may be used to monitor AIS HC trap temperature during the AIS HC trap purge event. As fuel vapors are desorbed from the AIS HC trap, temperature may decrease. As such, by monitoring temperature during the AIS HC trap purge event, a loading state of the AIS HC trap may be inferred. Responsive to an indication that AIS HC trap temperature is not further changing (cooling), it may be indicated that the AIS HC trap is clean. Accordingly, proceeding to 620, method 600 may include indicating whether AIS HC trap temperature change is less than a threshold. In some examples, the threshold may comprise a level where the AIS HC trap temperature is no longer changing. If, at 620 it is indicated that AIS HC trap temperature is continuing to change (e.g., cool), method 600 may return to 615, and may include continuing to monitor AIS HC trap temperature during the engine-on event where the throttle is commanded open. Alternatively, responsive to an indication at 620 that the AIS HC trap is clean, method 600 may proceed to 625, and may include resuming default driving conditions. For example, if driving conditions are such that engine operation is not needed, then the engine may deactivated, and the throttle may be commanded closed, for example. In other examples, based on driver demand, engine operation may be maintained. Method 600 may then end.

Turning now to FIG. 7, an example timeline 700 for conducting a CPV test diagnostic on a vehicle during a refueling event, and subsequently purging the AIS HC trap during engine operation, using the methods described herein and with reference to FIGS. 5-6. Timeline 700 includes plot 703, indicating whether the vehicle is on, or off, over time. Timeline 700 further includes plot 705, indicating whether an engine of the vehicle is on, or off, over time. Timeline 700 further includes plot 710, indicating whether a request for refueling is indicated, over time. Timeline 700 further includes plot 715, indicating a fuel tank pressure, as monitored for example, by a fuel tank pressure transducer (FTPT) (e.g., 291), over time. Pressure in the fuel tank may be at atmospheric pressure (atm.), or a negative (−) or positive (+) pressure with respect to atmosphere. Timeline 700 further includes plot 720, indicating whether a fuel tank isolation valve (FTIV) (e.g., 252) is open or closed, over time. Timeline 700 further includes plot 725, indicating an AIS HC trap loading state, over time.

Line 726 represents a first threshold, which may be indicative of a CPV that is degraded if reached during a refueling event. Line 727 represents a second threshold, which may indicate that the AIS HC trap is full (e.g., saturated) of fuel vapors. Line 728 further represents a third threshold, which may indicate that the AIS HC trap is substantially free of fuel vapors. Timeline 700 further includes plot 730, indicating a fuel level in a fuel tank of the vehicle, over time. Such an indication may be provided by a fuel level sensor (e.g., 234) located in the fuel tank, and may provide an indication of fuel level input (FLI) to the vehicle controller (e.g., 212). Timeline 700 further includes plot 735, indicating whether the canister purge valve (CPV) (e.g., 261) is open or closed, over time. Timeline 700 further includes plot 740, indicating a position of an air intake throttle (e.g., 262), over time. Timeline 700 further includes plot 745, indicating whether a CPV is functioning as desired (yes) or not (no), over time. Furthermore, while not explicitly illustrated, it may be understood that a canister vent valve (CVV) (e.g., 297) is open throughout the duration of timeline 700.

At time t0, the vehicle is in operation, indication by plot 703. Furthermore, the vehicle is operating via an engine, as indicated by plot 705. As the vehicle is in operation with the engine operating, pressure in the fuel tank, as indicated by a FTPT, is positive with respect to atmosphere, illustrated by plot 715, where the fuel tank is sealed via the FTIV, illustrated by plot 720. As the engine is operating, the AIS HC trap load is indicated to be low. This may be the result of the AIS HC trap (e.g., 224) being continuously cleaned during engine operation, as air is drawn through an intake (e.g., 242) and across the AIS HC trap, as discussed above. As discussed above, the AIS HC trap may include a one or more temperature sensor(s) (e.g., 236), where the one or more temperature sensors may be used to indicate AIS HC trap loading state. Fuel level in the tank is near empty, indicated by plot 730. Furthermore, the CPV is closed, illustrated by plot 735, and throttle position is at a position dictated by vehicle operator driving demand.

Between time t0 and t1, the vehicle comes to a stop. At time t1, the vehicle is turned off, and accordingly, the engine also stops rotating. A refueling request is initiated at time t2. As discussed above, a refueling request may comprise vehicle operator depression of a refueling button on a vehicle instrument panel (e.g., refueling button 197), or at a refueling door, removal of a gas cap, opening of a refueling door, etc. As the vehicle comprises a sealed fuel tank, the FTIV is commanded open by the controller to relieve pressure in the fuel tank. In other words, the controller sends a signal to actuate the FTIV to open responsive to the received refueling request. Accordingly, between time t2 and t3, pressure in the fuel tank returns to atmospheric pressure, indicated by plot 715. With pressure in the fuel tank at atmospheric pressure, refueling commences at time t3. Accordingly, between time t3 and t4, a level of fuel in the tank steadily rises, indicated by plot 730. While fuel in the tank is indicated to rise, AIS HC trap loading state, indicated by plot 725, additionally is indicated to rise. As discussed above, with the CPV closed during a refueling event, fuel vapor may be routed to the AIS HC trap if the CPV is degraded. For example, the CPV may be unable to close properly, due to one or more conditions such as rust, debris buildup, etc. As such, the path for fuel vapors from the fuel tank to the AIS HC trap may comprise a path of least resistance if the CPV is degraded, as the canister (e.g., 222) poses significant resistance to fuel vapor flow.

At time t4, AIS HC trap load reaches the first threshold, represented by line 726. Accordingly, a determination that the CPV is not functioning as desired (No) is indicated, as illustrated by plot 745. The indication that the CPV is not functioning as desired (e.g., degraded) may be stored at the controller, and may further result in the illumination of a malfunction indicator light (MIL) on the vehicle dash to alert the vehicle operator of the need to service the vehicle However, the refueling event is not indicated to be complete at time t4. Accordingly, between time t4 and t5, fuel level in the fuel tank continues to rise, and AIS HC trap load additionally continues to rise. At time t5, AIS HC trap load reaches the second threshold, represented by plot 727. For example, the second threshold may comprise a predetermined AIS HC load indicative of the AIS HC trap being saturated (or nearly saturated) with fuel vapors. As the AIS HC trap is saturated, or nearly saturated, with fuel vapors, in order to reduce undesired evaporative emissions stemming from the loaded AIS HC trap, the trap may be cleaned subsequent to the refueling event, as will be discussed below.

Between time t5 and t6, fuel level in the tank is indicated to plateau, illustrated by plot 730. At time t6, the refueling event is indicated to be complete, as refueling is no longer requested, illustrated by plot 710. As discussed above, completion of the refueling event may include the fuel level being stable for a predetermined duration of time, an indication that a refueling nozzle has been removed from the fuel filler neck, that a fuel cap has been replaced, that a refueling door has been closed, that a refueling lock has been re-locked, etc. As refueling is no longer requested at time t6, the FTIV is commanded closed, indicated by plot 720, thus sealing the fuel tank.

At time t7, a vehicle-on event is indicated, illustrated by plot 703. In this example timeline, it may be understood that the vehicle-on event comprises a vehicle-on event where the vehicle is being propelled solely by power from an onboard storage device (e.g., 150). Accordingly, as it was indicated that the second threshold AIS HC trap load was reached during the refueling event, the engine may be automatically commanded on (e.g., without an explicit request by a driver to activate the engine) in order to clean the AIS HC trap. Accordingly, at time t8, the engine is activated. As discussed above, activating the engine may include providing fuel and spark to the engine cylinders, for example by the controller sending a signal to actuate fuel injectors (e.g., 266) and spark plugs (e.g., 392). At time t9, the throttle (e.g., 262) is commanded open. With the engine activated (e.g., combusting air and fuel), by commanding open the throttle open air may be drawn through the intake and across the AIS HC trap, thus desorbing fuel vapors from the AIS HC trap, wherein the desorbed fuel vapors may be routed to engine cylinders for combustion. The process of fuel vapor desorption may be monitored by, for example, the temperature sensor(s) positioned in the AIS HC trap. Accordingly, with the throttle commanded open and the engine in operation, AIS HC trap load decreases between time t9 and t10. At time t10, AIS HC trap load reaches a third threshold, represented by line 728, where the third threshold may indicate that the AIS HC trap is clean, or nearly clean, of fuel vapors. For example, a clean AIS HC trap may be inferred based on temperature of the AIS HC trap no longer changing.

As the AIS HC trap is indicated to be clean, the vehicle may resume default driving conditions. For example, the default driving conditions may be based on vehicle operator demand. In example timeline 700, it may be understood that subsequent to the AIS HC trap being cleaned, driver demand is such that power from the engine is not needed. Accordingly, at time t10, the engine is deactivated (e.g., stops combustion and rotation). Deactivating the engine may include stopping fueling and spark to the engine cylinders. Furthermore, the throttle may be commanded to be returned to the position the throttle was prior to commanding on the engine to conduct the AIS HC trap cleaning procedure. Between time t10 and t11, the vehicle remains in operation, propelled via an onboard energy storage device.

Figure 8:
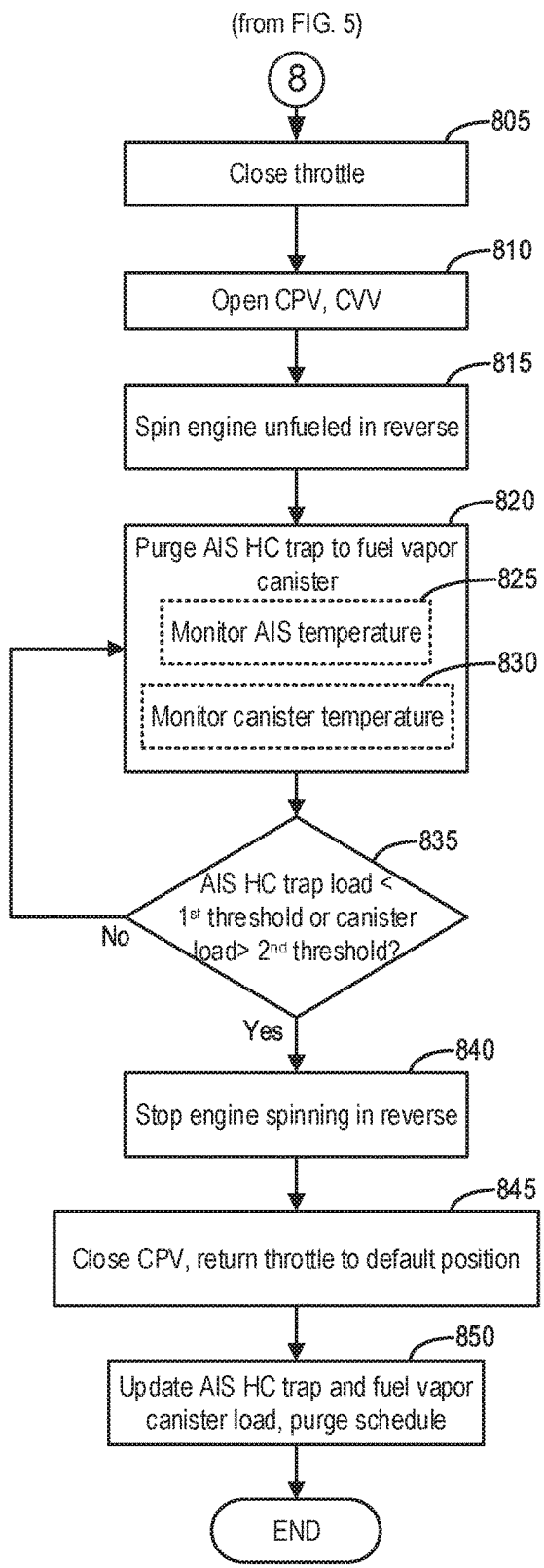
FIG. 8 shows a high level flowchart for an example method for cleaning the AIS HC trap by reverse engine operation.

Turning now to FIG. 8, a method 800 for cleaning an AIS HC trap by spinning an engine of the vehicle unfueled in reverse is shown. More specifically, method 800 may proceed from method 500 where it was determined that the AIS HC trap is saturated (or nearly saturated) with fuel vapors from a refueling event. As discussed above, if the AIS HC trap is saturated with fuel vapors and the vehicle is either not driven, or in some examples driven in electric-only mode, undesired evaporative emissions may escape from the AIS HC trap to atmosphere. As such, it is desirable to clean the AIS HC trap, while conserving fuel economy. Accordingly, spinning the engine unfueled in reverse may route fuel vapors from the AIS HC trap to the fuel vapor canister for storage, without needing to fuel the engine, as will be discussed below.

Method 800 will be described with reference to the systems described herein and shown in FIGS. 1-4B, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIG. 1 and FIG. 2. The controller may alter engine, evaporative emission systems, or fuel delivery system operating states via employing vehicle system actuators, such as fuel tank isolation valve (FTIV) (e.g., 252), throttle (e.g., 262), canister purge valve (CPV) (e.g. 261), electric motor (e.g., 120), canister vent valve (CVV) (e.g., 297), etc., according to the method below.

Method 800 begins at 805 and may include commanding closed the throttle. It may be understood that the FTIV is additionally closed, having been closed according to method 500 responsive to an indication of completion of a refueling event. By closing the throttle, air in the intake manifold (e.g., 244) is prevented from escaping to atmosphere. Further, air and fuel vapors may be directed to the fuel vapor canister (e.g., 222) discussed in further detail below via spinning the engine in reverse (e.g., rotating the engine in a direction opposite to its direction of rotation when the engine is combusting air and fuel).

Proceeding to 810, method 800 may include commanding open the CPV and commanding open or maintaining open the CVV. By commanding open the CPV, and with the CVV open, engine intake may be communicatively coupled to the fuel vapor canister. In other words, a pathway from engine intake to the fuel vapor canister may be established by commanding open the CPV. Further, by commanding open or maintaining open the CVV, flow of air and fuel vapors may be directed through the fuel vapor canister to atmosphere, responsive to reverse engine spinning, discussed further below.

Accordingly, continuing to 815, method 800 may include spinning the engine unfueled in reverse. For example, an electric motor, such as a starter motor, may be operated to spin the engine in reverse, as discussed above with regard to FIG. 3 and FIGS. 4A-4B. The controller may disable fuel injection and spark to the engine cylinders. By spinning the engine in reverse, where exhaust valves open, followed by intake valves, a positive pressure may develop in the intake manifold, where the positive pressure is directed toward the fuel vapor canister. Accordingly, a vacuum may develop at the exhaust manifold (e.g., 248). As such, fresh air may be drawn through the exhaust manifold to the intake manifold, and further drawn across the AIS HC trap (e.g., 224). By drawing fresh air across the AIS HC trap, fuel vapors stored therein may be desorbed. Furthermore, with the throttle closed, and the CPV and CVV open, desorbed fuel vapors may be routed from the intake manifold to the fuel vapor canister for adsorption, prior to exiting to atmosphere. Accordingly, at 820, method 800 may include purging the AIS HC trap to the fuel vapor canister. During the purging, AIS HC temperature may be monitored in order to infer AIS HC trap loading state. Furthermore, temperature in the fuel vapor canister may additionally be monitored in order to infer a fuel vapor canister loading state. For example, AIS HC temperature may be monitored by one or more temperature sensor(s) (e.g., 236) at 825, while fuel vapor canister temperature may similarly be monitored by one or more temperature sensor(s) (e.g., 232) at 830. As described above, by monitoring temperature changes within the AIS HC trap and the fuel vapor canister, AIS HC trap load and fuel vapor canister load may be inferred.

Transferring AIS hydrocarbons to the fuel vapor storage canister (e.g., 222 of FIG. 2) may allow fuel vapors trapped during engine refueling to be purged and combusted by the engine at a controllable and desirable rate as compared to if fuel vapors are released from the AIS HC trap. For example, a position of the CPV valve may be modulated after engine start to control flow of fuel vapors into the engine. On the other hand, the AIS HC trap may release vapors at a rate that is less controllable. Consequently, engine air-fuel ratio control may be improved.

Accordingly, at 835, method 800 may include indicating whether AIS HC trap load is lower than a first threshold, or if fuel vapor canister load is greater than a second threshold. For example, as fuel vapors are desorbed from the AIS HC trap, temperature may decrease as monitored by the temperature sensor(s), and when the AIS HC trap is free, or nearly free of fuel vapors, the AIS HC trap temperature may no longer change. However, as fuel vapors are desorbed from the AIS HC trap and routed to the fuel vapor canister, the fuel vapor canister load may thus increase. Such a fuel vapor canister load increase may be indicated by a temperature increase at the fuel vapor canister. A fuel vapor canister increase above a threshold may be indicative of a saturated fuel vapor canister. In a case where the fuel vapor canister is saturated and if the engine were continued to be spun in reverse, fuel vapors may be routed out of the fuel vapor canister to atmosphere, thus resulting in undesired emissions. Accordingly, at 835, if it is indicated that AIS HC trap load is not below the first threshold, and that fuel vapor canister load is not above the second threshold, method 800 may continue to purge the AIS HC trap to the fuel vapor canister by spinning the engine unfueled in reverse. However, responsive to an indication that the AIS HC trap load is lower than the first threshold, or responsive to an indication that the fuel vapor canister load is greater than the second threshold, method 800 may proceed to 840.

At 840, method 800 may include stopping spinning the engine in reverse. Proceeding to 845, method 800 may include commanding closed the CPV, and returning the throttle to a default position, such as where the throttle was positioned prior to commanding the throttle closed. Proceeding to 850, method 800 may include updating AIS HC trap loading state, and fuel vapor canister loading state. For example, the AIS HC trap may be indicated to be clean, while the fuel vapor canister may be indicated to be loaded to an indicated amount. In an example scenario where the reverse engine spinning was stopped responsive to an indication that the fuel vapor canister was saturated, the AIS HC trap loading state may be indicated, and the fuel vapor canister loading state may be indicated to be full (saturated). As such, at 850, method 800 may further include updating a purge schedule. For example, if the fuel vapor canister is saturated with fuel vapors, at the next vehicle-on event the engine may be activated in order to clean the canister of fuel vapors, to prevent undesired evaporative emissions (e.g., bleed-through). In another example, where the AIS HC trap was indicated to be free, or nearly free, of fuel vapors and where the fuel vapor canister is not indicated to be saturated, the engine may not be commanded on at the next vehicle-on event, but rather a purge event may be initiated responsive to the next engine-on event dictated by driver demand.

Turning now to FIG. 9, an example timeline 900 for conducting a CPV test diagnostic on a vehicle during a refueling event, and subsequently purging the AIS HC trap by reverse engine operation, using the methods described herein and with reference to FIG. 5 and FIG. 8, is shown. Timeline 900 includes plot 905, indicating whether the vehicle is in operation (on), or not (off), over time. Timeline 900 further includes plot 910, indicating whether a request for refueling is indicated, over time. Timeline 900 further includes plot 915, indicating a fuel tank pressure, as monitored for example, by a fuel tank pressure transducer (FTPT) (e.g., 291), over time. Pressure in the fuel tank may be at atmospheric pressure (atm.), or at a negative (−) or positive (+) pressure with respect to atmosphere.

Timeline 900 further includes plot 920, indicating an AIS HC trap loading state, over time. Line 921 represents a first threshold, which may be indicative of a CPV that is degraded if reached during a refueling event. Line 922 represents a second threshold, which may indicate that the AIS HC trap is full (e.g. saturated) of fuel vapors. Line 923 further represents a third threshold, which may indicate that the AIS HC trap is substantially free of fuel vapors.

Timeline 900 further includes plot 925, indicating whether a canister purge valve (CPV) (e.g., 261) is open, or closed, over time. Timeline 900 further includes plot 930, indicating a position of an air intake throttle (e.g., 262), over time. Timeline 900 further includes plot 935, indicating whether a fuel tank isolation valve (FTIV) (e.g., 252) is open, or closed, over time. Timeline 900 further includes plot 940, indicating a fuel level in a fuel tank of the vehicle, over time. Such an indication may be provided by a fuel level sensor (e.g., 234) located in the fuel tank, and may provide an indication of fuel level input (FLI) to the vehicle controller (e.g., 212). Timeline 900 further includes plot 945, indicating whether an electric motor of the vehicle is off, operating in a forward direction to turn the engine in a forward (default) direction, or operating in a reverse direction to turn the engine in a reverse direction, over time.

Timeline 900 further includes plot 950, indicating a fuel vapor canister (e.g., 222) loading state, over time. Line 951 represents a threshold fuel vapor canister load, which may indicate that the fuel vapor canister is saturated (or nearly saturated) with fuel vapors. Timeline 900 further includes plot 955, indicating whether a CPV is functioning as desired (yes) or not (no), over time. It may be understood that aspects of timeline 900 are the same as those of timeline 700. As such, to avoid redundancy, those aspects that are the same will be briefly reiterated here with regard to timeline 900. Furthermore, while not explicitly illustrated, it may be understood that a canister vent valve (CVV) (e.g., 297) is maintained open for the duration of timeline 900.

At time t0, the vehicle is in operation, indicated by plot 905. As the electric motor is indicated to be off, illustrated by plot 945, it may be understood that the vehicle is being propelled via engine operation. As the vehicle is in operation, refueling is not requested, indicated by plot 910. The fuel tank is holding positive pressure, indicated by plot 915, as the engine is operating and the FTIV is closed, indicated by plot 935. As the vehicle is traveling via engine operation, the AIS HC trap loading state is low, indicated by plot 920, as the trap may be continually purged during engine operation, as discussed above. The CPV, indicated by plot 925, is closed, and the throttle position is a function of driver demand, indicated by plot 930. Fuel level in the fuel tank is near empty, indicated by plot 940, and the fuel vapor canister loading state is low (clean, or nearly clean), indicated by plot 950. Finally, a CPV is indicated to be functioning as desired at time t0, illustrated by plot 955.

At time t1, the vehicle comes to a stop and the vehicle is turned off. At time t2, a vehicle refueling event is requested, as described above. As the vehicle comprises an FTIV, the FTIV is commanded open at time t2 in order to depressurize the fuel tank prior to enabling fuel to be added to the tank. Accordingly, between time t2 and t3, pressure in the fuel tank returns to atmospheric pressure, indicated by plot 915. At time t3, fuel begins being added to the fuel tank. As such, between time t3 and t4, fuel level is indicated to steadily rise, illustrated by plot 940. Furthermore, AIS HC trap load is indicated to steadily rise between time t3 and t4. As discussed above, AIS HC trap load may be inferred by monitoring one or more temperature sensor(s) positioned within the AIS HC trap. As the CPV is indicated to be closed, yet the AIS HC loading state is indicated to rise during the refueling event, fuel vapors must be being routed from the fuel tank to the intake manifold, where they are being adsorbed by the AIS HC trap.

At time t4, the AIS HC trap loading state reaches the first threshold, represented by line 921, indicative of a CPV that is not functioning as desired (e.g., degraded). Accordingly, an indication that the CPV not functioning as desired is indicated, illustrated by plot 955. As discussed above, the indication may be stored at the controller, and a malfunction indicator light (MIL) may be further illuminated on the vehicle dash in order to alert the vehicle operator of the need to service the vehicle. However, the refueling event is not complete, indicated by plot 910, and as such fuel level in the tank continues to rise between time t4 and t5, and AIS HC trap loading state additionally continues to rise.

At time t5, the AIS HC trap loading state reaches the second threshold, represented by line 922. As such, the AIS HC trap is saturated (or nearly saturated), and as such the AIS HC trap may need to be purged (cleaned) subsequent to the refueling event in order to prevent undesired evaporative emissions. Between time t5 and t6, fuel level in the fuel tank remains plateaued, and at time t6 refueling is no longer requested. As discussed above, completion of the refueling event may include the fuel level being stable for a predetermined duration of time, an indication that a refueling nozzle has been removed from the fuel filler neck, that a fuel cap has been replaced, that a refueling door has been closed, that a refueling lock has been re-locked, etc. As refueling is no longer requested at time t6, the FTIV is commanded closed, indicated by plot 935, thus sealing the fuel tank. As the vehicle is indicated to be off, at time t7 the CPV is commanded open and the throttle is commanded closed. As discussed above with regard to step 575 of method 500, in some examples the vehicle may need to be maintained off for a predetermined time duration prior to initiating a reverse engine spinning procedure.

For example, if the refueling event is indicated to be complete and the vehicle is not indicated to be turned on within a predetermined time frame, the reverse engine spinning procedure may be initiated. Furthermore, while not explicitly illustrated, it may be understood that the CVV may be maintained open. With the CPV open, the throttle closed, and the CVV open, a pathway from the intake manifold to the fuel vapor canister may be established. Accordingly, at time t8, the electric motor is commanded on in reverse, in order to spin the engine in reverse. Fuel injection and spark may be disabled, such that the engine may be spun in reverse unfueled. As discussed above, by spinning the engine unfueled in reverse, a vacuum may develop in the exhaust manifold and a positive pressure may develop in the intake manifold. As such, air may be drawn from the exhaust manifold to the intake manifold and across the AIS HC trap, thus desorbing fuel vapors from the AIS HC trap, which may then be routed to the fuel vapor canister. Thus, between time t8 and t9, AIS HC trap load is indicated to decrease, while fuel vapor canister load is indicated to increase, where the fuel vapor canister load increase is the result of desorbed fuel vapors from the AIS HC trap becoming adsorbed by the fuel vapor canister.

At time t9, the AIS HC trap is indicated to be clean (free or nearly free) of fuel vapors, as the third threshold is reached, represented by line 923. Fuel vapor canister load is indicated to be nearly at a saturation point, represented by line 951, however the fuel vapor canister does not become saturated by the time the AIS HC trap is indicated to be clean. Accordingly, the CPV is commanded closed, the throttle is commanded to return to a default position based on throttle position before the reverse engine spinning operation, and the electric motor is commanded off. Between time t9 and t10, the vehicle remains off, indicated by plot 905. As such, the refueling event may comprise a condition where the vehicle was remotely refueled, and then not driven, or an example where the vehicle operator went into a fueling station to pay or to purchase other items, while leaving the car in a vehicle-off state.

In this way, whether a CPV is functioning as desired may be indicated without engine operation. Such a method for indicating whether a CPV is functioning as desired without the use of engine operation may be advantageous for vehicles such as HEVs, PHEVs, or other vehicles configured to run with limited intake manifold vacuum. By monitoring AIS HC temperature during a refueling event, whether the CPV is functioning as desired may be conclusively determined, as if the CPV were functioning as desired, then no pathway would enable fuel vapors from the fuel tank to be routed to the AIS HC trap.

The technical effect is to incorporate one or more temperature sensor(s) into the AIS HC trap, such that AIS HC trap may be monitored during a refueling event. By monitoring AIS HC trap temperature, whether fuel vapors are being routed from the fuel tank to the AIS HC trap may be determined. A further technical effect is to spin the engine unfueled in reverse responsive to an indication that the AIS HC trap has become saturated, or nearly saturated, with fuel vapors during the refueling event. If the AIS HC trap is saturated with fuel vapors, and the vehicle is subsequently driven in electric-only mode, for example, undesired emissions may result as fuel vapors migrate from the AIS HC trap to atmosphere. Accordingly, by spinning the engine unfueled in reverse responsive to an indication that the AIS HC trap is saturated, or nearly saturated with fuel vapors, the fuel vapors may be routed to the fuel vapor canister, where they may be stored until the next engine-on event, at which point they may be purged to engine intake for combustion. In this way, undesired evaporative emissions may be reduced, and fuel economy may be improved.

The systems described herein and with reference to FIGS. 1-4B, along with the methods described herein and with reference to FIGS. 5, 6 and 8, may enable one or more systems and one or more methods. In one example, a method comprises monitoring a fuel vapor loading state of an adsorbent material positioned in an engine air intake while fuel is being added to a fuel tank that supplies fuel to the engine; and responsive to an indication that an increase in the fuel vapor loading state is greater than a first predetermined threshold: indicating a canister purge valve configured to seal the fuel tank from the engine air intake is degraded. In a first example of the method, the method further includes wherein the adsorbent material positioned in the engine air intake comprises an air intake system hydrocarbon trap (AIS HC), and wherein the adsorbent material includes one or more of carbon, activated carbon, or zeolites, and further comprising automatically starting an engine of the vehicle responsive to the fuel vapor loading state being greater than a second predetermined threshold. A second example of the method optionally includes the first example and further includes wherein the fuel vapor loading state of the adsorbent material is indicated while fuel is being added to the fuel tank based on a monitored temperature change of the adsorbent material; wherein the temperature change is monitored by one or more temperature sensors embedded in the adsorbent material; and wherein a temperature increase indicates the adsorption of fuel vapors by the adsorbent material, and a temperature decrease indicates the desorption of fuel vapors from the adsorbent material. A third example of the method optionally includes any one or more or each of the first and second examples, and further includes wherein the canister purge valve is commanded closed prior to the fuel being added to the fuel tank in order to seal the fuel tank from the engine air intake; and wherein the canister purge valve is maintained closed during the fuel being added to the fuel tank. A fourth example of the method optionally includes any one or more or each of the first through third examples and further includes wherein fuel vapors from the fuel tank generated while adding fuel to the fuel tank are routed from the fuel tank to the engine air intake through the canister purge valve that is degraded, and further comprising adjusting the first predetermined threshold in response to ambient temperature. A fifth example of the method optionally includes any one or more or each of the first through fourth examples and further comprises adsorbing fuel vapors from the fuel tank in a fuel vapor storage canister positioned in an evaporative emissions control system of the vehicle; wherein fuel vapors from the fuel tank are routed from the fuel tank to the fuel vapor storage canister and not to the adsorbent material positioned in the engine air intake while fuel is being added to the tank responsive to the canister purge valve functioning as desired.

Another example of a method comprises monitoring a fuel vapor loading state of an adsorbent material positioned in an engine air intake while fuel is being added to a fuel tank that supplies fuel to a vehicle engine; and responsive to an indication that an increase in the fuel vapor loading state is greater than a first predetermined threshold but less than a second predetermined threshold: indicating a canister purge valve configured to seal the fuel tank from the intake manifold is degraded, and not actively purging the adsorbent material; and responsive to an indication that an increase in the fuel vapor loading state is greater than the first predetermined threshold and greater than the second predetermined threshold: indicating the canister purge valve configured to seal the fuel tank from the intake manifold is degraded, and actively purging the adsorbent material. In a first example of the method, the method further comprises adsorbing fuel vapors from the fuel tank in an adsorbent material contained in a fuel vapor canister positioned in an evaporative emissions control system of the vehicle; wherein fuel vapors from the fuel tank generated while adding fuel to the fuel tank are routed from the fuel tank to the fuel vapor canister and not to the adsorbent material positioned in the engine air intake responsive to the canister purge valve functioning as desired; and wherein fuel vapors from the fuel tank generated while adding fuel to the fuel tank are routed from the fuel tank to the adsorbent material positioned in the engine air intake through the canister purge valve responsive to the canister purge valve being degraded. A second example of the method optionally includes the first example and further includes wherein the fuel vapor loading state of the adsorbent material positioned in the engine air intake and a fuel vapor loading state of the fuel vapor canister are indicated based on temperature changes of the adsorbent material positioned in the engine air intake and temperature changes of the adsorbent material contained in the fuel vapor canister; wherein temperature changes of the adsorbent material positioned in the engine air intake are monitored by one or more temperature sensor(s) positioned in the adsorbent material positioned in the engine air intake; and wherein temperature changes of the adsorbent material contained in the fuel vapor canister are monitored by one or more temperature sensor(s) positioned in the adsorbent material contained in the fuel vapor canister. A third example of the method optionally includes any one or more or each of the first and second examples and further includes wherein actively purging the adsorbent material further comprises: in a first condition, spinning the vehicle engine fueled in a forward direction and commanding open an air intake throttle that controls airflow to an intake manifold of the engine, where spinning the engine fueled in the forward direction creates vacuum in the intake manifold; and in a second condition, spinning the vehicle engine unfueled in a reverse direction and commanding closed the air intake throttle, where spinning the vehicle engine unfueled in the reverse direction creates vacuum in an exhaust manifold of the engine. A fourth example of the method optionally includes any one or more or each of the first through third examples and further includes wherein the first condition further comprises: commanding or maintaining closed the canister purge valve; and wherein vacuum created in the intake manifold by spinning the engine fueled in the forward direction draws atmospheric air past the air intake throttle and across the adsorbent material positioned in the engine air intake, desorbing fuel vapors from the adsorbent material and routing the desorbed fuel vapors to the engine where the fuel vapors are combusted. A fifth example of the method optionally includes any one or more or each of the first through fourth examples and further includes wherein the first condition further comprises: monitoring temperature change during the desorbing of fuel vapors from the adsorbent material positioned in the engine air intake via the one or more temperature sensor(s) positioned in the adsorbent material positioned in the engine air intake; and indicating the adsorbent material positioned in the engine air intake is clean responsive to temperature change below a predetermined threshold. A sixth example of the method optionally includes any one or more or each of the first through fifth examples and further includes wherein responsive to an indication that the adsorbent material in the intake manifold is clean, resuming default driving conditions based on vehicle operator demand. A seventh example of the method optionally includes any one or more or each of the first through sixth examples and further includes wherein the second condition further comprises: commanding open the canister purge valve; and wherein vacuum created in the exhaust manifold by spinning the engine unfueled in reverse draws atmospheric air across the adsorbent material positioned in the engine air intake, desorbing fuel vapors from the adsorbent material and routing the desorbed fuel vapors to the fuel vapor canister positioned in the evaporative emissions control system where the fuel vapors are adsorbed. An eighth example of the method optionally includes any one or more or each of the first through seventh examples and further includes wherein the second condition further comprises: monitoring temperature change of the adsorbent material positioned in the engine air intake during the desorption of fuel vapors, where temperature change below a threshold indicates fuel vapor load of the adsorbent material positioned in the engine air intake below a first threshold; monitoring temperature change of the adsorbent material contained in the fuel vapor canister during the adsorption of fuel vapors, where temperature change above another threshold indicates fuel vapor load of the adsorbent material contained in the fuel vapor canister above a second threshold; and stopping spinning the engine unfueled in reverse responsive to fuel vapor load of the adsorbent material positioned in the intake manifold below the first threshold, or responsive to fuel vapor load of the adsorbent material contained in the fuel vapor canister above the second threshold. A ninth example of the method optionally includes any one or more or each of the first through eighth examples and further includes wherein the first condition includes a vehicle-on condition within a predetermined time duration of an indication of completion of fuel being added to the fuel tank; and wherein the second condition includes the vehicle being maintained off for the predetermined time duration. A tenth example of the method optionally includes any one or more or each of the first through ninth examples and further comprises selectively coupling the fuel tank to the adsorbent material contained in the fuel vapor canister positioned in the evaporative emissions control system via a fuel tank isolation valve positioned in a conduit between the fuel tank and the fuel vapor canister; wherein the fuel tank isolation valve is commanded open prior to adding fuel to the fuel tank, and is maintained open during adding fuel to the fuel tank; and wherein the second condition includes commanding closed the fuel tank isolation valve to seal the fuel tank from the engine air intake and from the fuel vapor canister.

An example of a system for a hybrid vehicle comprises an engine comprising one or more cylinders, each cylinder including an intake valve and an exhaust valve; fuel injectors for each of the one or more cylinders; a spark plug for each of the one or more cylinders; an engine exhaust; a fuel vapor canister selectively coupled to an engine intake manifold via a canister purge valve; a fuel tank that supplies fuel to the engine, the fuel tank selectively coupled to the fuel vapor canister via a fuel tank isolation valve; an air intake system hydrocarbon trap positioned in the engine intake manifold; one or more temperature sensor(s) positioned in the fuel vapor canister; one or more temperature sensor(s) positioned in the air intake system hydrocarbon trap; and a controller configured with instructions stored in non-transitory memory, that when executed cause the controller to: responsive to a request for refueling of the fuel tank, command open the fuel tank isolation valve; command closed or maintain closed the canister purge valve; monitor temperature of the air intake system hydrocarbon trap during refueling of the fuel tank; and indicate the canister purge valve is degraded responsive to a temperature increase in the air intake system hydrocarbon trap above a first predetermined threshold. In a first example, the system further comprises an electric motor configured to rotate the engine; and wherein the controller is further configured with instructions stored in non-transitory memory, that when executed cause the controller to: responsive to a temperature increase in the air intake system hydrocarbon trap above a second predetermined threshold, and further responsive to an indication of completion of refueling; command open the canister purge valve; command closed the fuel tank isolation valve; and operate the electric motor to rotate the engine in a reverse direction without combusting fuel, where rotating the engine unfueled draws air from the exhaust manifold into the intake manifold. A second example of the system optionally includes the first example and further includes wherein the controller is further configured with instructions stored in non-transitory memory, that when executed cause the controller to: monitor temperature in the air intake system hydrocarbon trap; monitor temperature in the fuel vapor canister; and responsive to an absence of temperature change in the air intake system hydrocarbon trap, or responsive to a temperature change in the fuel vapor canister above a threshold: stop rotating the engine in the reverse direction without combusting fuel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
monitoring a fuel vapor loading state of an adsorbent material positioned in an engine air intake while fuel is being added to a fuel tank that supplies fuel to a vehicle engine; and
responsive to an indication that an increase in the fuel vapor loading state is greater than a first predetermined threshold but less than a second predetermined threshold:
indicating a canister purge valve configured to seal the fuel tank from an intake manifold is degraded, and not actively purging the adsorbent material; and
responsive to an indication that an increase in the fuel vapor loading state is greater than the first predetermined threshold and greater than the second predetermined threshold:
indicating the canister purge valve configured to seal the fuel tank from the intake manifold is degraded, and actively purging the adsorbent material.

2. The method of claim 1, further comprising:
adsorbing fuel vapors from the fuel tank in an adsorbent material contained in a fuel vapor canister positioned in an evaporative emissions control system of a vehicle;
wherein fuel vapors from the fuel tank generated while adding fuel to the fuel tank are routed from the fuel tank to the fuel vapor canister and not to the adsorbent material positioned in the engine air intake responsive to the canister purge valve functioning as desired; and
wherein fuel vapors from the fuel tank generated while adding fuel to the fuel tank are routed from the fuel tank to the adsorbent material positioned in the engine air intake through the canister purge valve responsive to the canister purge valve being degraded.

3. The method of claim 2, wherein the fuel vapor loading state of the adsorbent material positioned in the engine air intake and a fuel vapor loading state of the fuel vapor canister are indicated based on temperature changes of the adsorbent material positioned in the engine air intake and temperature changes of the adsorbent material contained in the fuel vapor canister;
wherein temperature changes of the adsorbent material positioned in the engine air intake are monitored by one or more temperature sensor(s) positioned in the adsorbent material positioned in the engine air intake; and
wherein temperature changes of the adsorbent material contained in the fuel vapor canister are monitored by the one or more temperature sensor(s) positioned in the adsorbent material contained in the fuel vapor canister.

4. The method of claim 3, wherein actively purging the adsorbent material further comprises:
in a first condition, spinning the vehicle engine fueled in a forward direction and commanding open an air intake throttle that controls airflow to an intake manifold of the vehicle engine, where spinning the vehicle engine fueled in the forward direction creates vacuum in the intake manifold; and
in a second condition, spinning the vehicle engine unfueled in a reverse direction and commanding closed the air intake throttle, where spinning the vehicle engine unfueled in the reverse direction creates vacuum in an exhaust manifold of the engine.

5. The method of claim 4, wherein the first condition further comprises:
commanding or maintaining closed the canister purge valve; and
wherein vacuum created in the intake manifold by spinning the vehicle engine fueled in the forward direction draws atmospheric air past the air intake throttle and across the adsorbent material positioned in the engine air intake, desorbing fuel vapors from the adsorbent material and routing the desorbed fuel vapors to the vehicle engine where the fuel vapors are combusted.

6. The method of claim 5, wherein the first condition further comprises:
monitoring temperature change during the desorbing of fuel vapors from the adsorbent material positioned in the engine air intake via the one or more temperature sensor(s) positioned in the adsorbent material positioned in the engine air intake; and
indicating the adsorbent material positioned in the engine air intake is clean responsive to temperature change below a predetermined threshold.

7. The method of claim 6, wherein responsive to an indication that the adsorbent material in the intake manifold is clean, resuming default driving conditions based on vehicle operator demand.

8. The method of claim 4, wherein the second condition further comprises:
commanding open the canister purge valve; and
wherein vacuum created in the exhaust manifold by spinning the vehicle engine unfueled in reverse draws atmospheric air across the adsorbent material positioned in the engine air intake, desorbing fuel vapors from the adsorbent material and routing the desorbed fuel vapors to the fuel vapor canister positioned in the evaporative emissions control system where the fuel vapors are adsorbed.

9. The method of claim 8, wherein the second condition further comprises:
monitoring temperature change of the adsorbent material positioned in the engine air intake during the desorption of fuel vapors, where temperature change below a threshold indicates fuel vapor load of the adsorbent material positioned in the engine air intake below a first threshold;
monitoring temperature change of the adsorbent material contained in the fuel vapor canister during the adsorption of fuel vapors, where temperature change above another threshold indicates fuel vapor load of the adsorbent material contained in the fuel vapor canister above a second threshold; and
stopping spinning the vehicle engine unfueled in reverse responsive to fuel vapor load of the adsorbent material positioned in the intake manifold below the first threshold, or responsive to fuel vapor load of the adsorbent material contained in the fuel vapor canister above the second threshold.

10. The method of claim 4, wherein the first condition includes a vehicle-on condition within a predetermined time duration of an indication of completion of fuel being added to the fuel tank; and wherein the second condition includes the vehicle being maintained off for the predetermined time duration.

11. The method of claim 4, further comprising:
selectively coupling the fuel tank to the adsorbent material contained in the fuel vapor canister positioned in the evaporative emissions control system via a fuel tank isolation valve positioned in a conduit between the fuel tank and the fuel vapor canister;

wherein the fuel tank isolation valve is commanded open prior to adding fuel to the fuel tank, and is maintained open during adding fuel to the fuel tank; and wherein the second condition includes commanding closed the fuel tank isolation valve to seal the fuel tank from the engine air intake and from the fuel vapor canister.

12. A system for a hybrid vehicle, comprising:

an engine comprising one or more cylinders, each cylinder including an intake valve and an exhaust valve;

fuel injectors for each of the one or more cylinders;

a spark plug for each of the one or more cylinders;

an engine exhaust;

a fuel vapor canister selectively coupled to an engine intake manifold via a canister purge valve;

a fuel tank that supplies fuel to the engine, the fuel tank selectively coupled to the fuel vapor canister via a fuel tank isolation valve;

an air intake system hydrocarbon trap positioned in the engine intake manifold;

one or more temperature sensor(s) positioned in the fuel vapor canister;

one or more temperature sensor(s) positioned in the air intake system hydrocarbon trap; and a controller configured with instructions stored in non-transitory memory, that when executed, cause the controller to:

responsive to a request for refueling of the fuel tank, command open the fuel tank isolation valve;

command closed or maintain closed the canister purge valve;

monitor temperature of the air intake system hydrocarbon trap during refueling of the fuel tank; and indicate the canister purge valve is degraded responsive to a temperature increase in the air intake system hydrocarbon trap above a first predetermined threshold.

13. The system of claim 12, further comprising:

an electric motor configured to rotate the engine; and wherein the controller is further configured with instructions stored in non-transitory memory, that when executed, cause the controller to:

responsive to a temperature increase in the air intake system hydrocarbon trap above a second predetermined threshold, and further responsive to an indication of completion of refueling;

command open the canister purge valve;

command closed the fuel tank isolation valve; and operate the electric motor to rotate the engine in a reverse direction without combusting fuel, where rotating the engine unfueled draws air from an exhaust manifold into the engine intake manifold.

14. The system of claim 13, wherein the controller is further configured with instructions stored in non-transitory memory, that when executed, cause the controller to:

monitor temperature in the air intake system hydrocarbon trap;

monitor temperature in the fuel vapor canister; and responsive to an absence of temperature change in the air intake system hydrocarbon trap, or responsive to a temperature change in the fuel vapor canister above a threshold:

stop rotating the engine in the reverse direction without combusting fuel.

\* \* \* \* \*